US012567081B1

(12) United States Patent
Miller et al.

(10) Patent No.: US 12,567,081 B1
(45) Date of Patent: Mar. 3, 2026

(54) SYNTHESIZED AUDIENCES FOR CONTENT ITEMS

(71) Applicant: Amazon Technologies, Inc., Seattle, WA (US)

(72) Inventors: John Martin Miller, Seattle, WA (US); Tony Lau, New Hyde Park, NY (US); Sagar Chodapaneedi, Edinburgh (GB)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/703,897

(22) Filed: Mar. 24, 2022

(51) Int. Cl.
*G06Q 30/0204* (2023.01)
*G06Q 50/00* (2012.01)

(52) U.S. Cl.
CPC ......... *G06Q 30/0204* (2013.01); *G06Q 50/01* (2013.01)

(58) Field of Classification Search
CPC ........................... G06Q 50/01; G06Q 30/0204
See application file for complete search history.

(56) References Cited

U.S. PATENT DOCUMENTS

| | | | |
|---|---|---|---|
| 8,799,814 | B1 | 8/2014 | Bryc et al. |
| 10,127,325 | B2 | 11/2018 | Damman et al. |
| 10,497,012 | B1 | 12/2019 | Majumder et al. |
| 10,614,139 | B2 | 4/2020 | Fujioka et al. |
| 10,853,415 | B2 | 12/2020 | Bernhardsson et al. |
| 11,023,554 | B1 | 6/2021 | Miller et al. |
| 11,080,760 | B2 | 8/2021 | Nicholas et al. |
| 11,157,681 | B2 | 10/2021 | Weald et al. |
| 11,176,210 | B1 | 11/2021 | Miller et al. |
| 2019/0104339 | A1* | 4/2019 | Tsivin ...................... G06F 17/18 |
| 2021/0090097 | A1* | 3/2021 | Froman .............. G06Q 30/0203 |

* cited by examiner

*Primary Examiner* — Deirdre D Hatcher
(74) *Attorney, Agent, or Firm* — S. Scott Foster; Kowert, Hood, Munyon, Rankin & Goetzel, P.C.

(57) ABSTRACT

A behavior-dependent audience populated with content consumers based on analysis of records of their actions is identified. Rules for including content consumers, without using their identity information, within a synthesized audience are generated based on a relationship determined between membership in the behavior-dependent audience and a set of properties of content presentation triggering events. In response to a particular content presentation triggering event, a content item which is targeted to the behavior-dependent audience is presented to a particular content consumer who satisfies a rule for inclusion in the synthesized audience.

24 Claims, 12 Drawing Sheets

Populate behavior-dependent audiences (BAs) for a set of content items, using records of content consumer actions along with consumer identity information for whose collection the consumers have opted in  801

Determine statistical/predictive relationships (e.g., correlations, anti-correlations) between membership in BAs and contextual properties of content presentation triggering events  804

Generate, based at least in part on the relationships, a rule set for including content consumers (e.g., those content consumers who do not opt in to the collection of identity information) in synthesized audiences (SAs) which are associated with the BAs  807

In response to a content presentation triggering event which has a targeted BA, use the event's contextual information to add an SA to the set of target audiences associated with the event, and cause a content item which was initially targeted for presentation to a given BA to be presented to a content consumer who satisfies rules for inclusion in the corresponding SA  810

Figure 3:
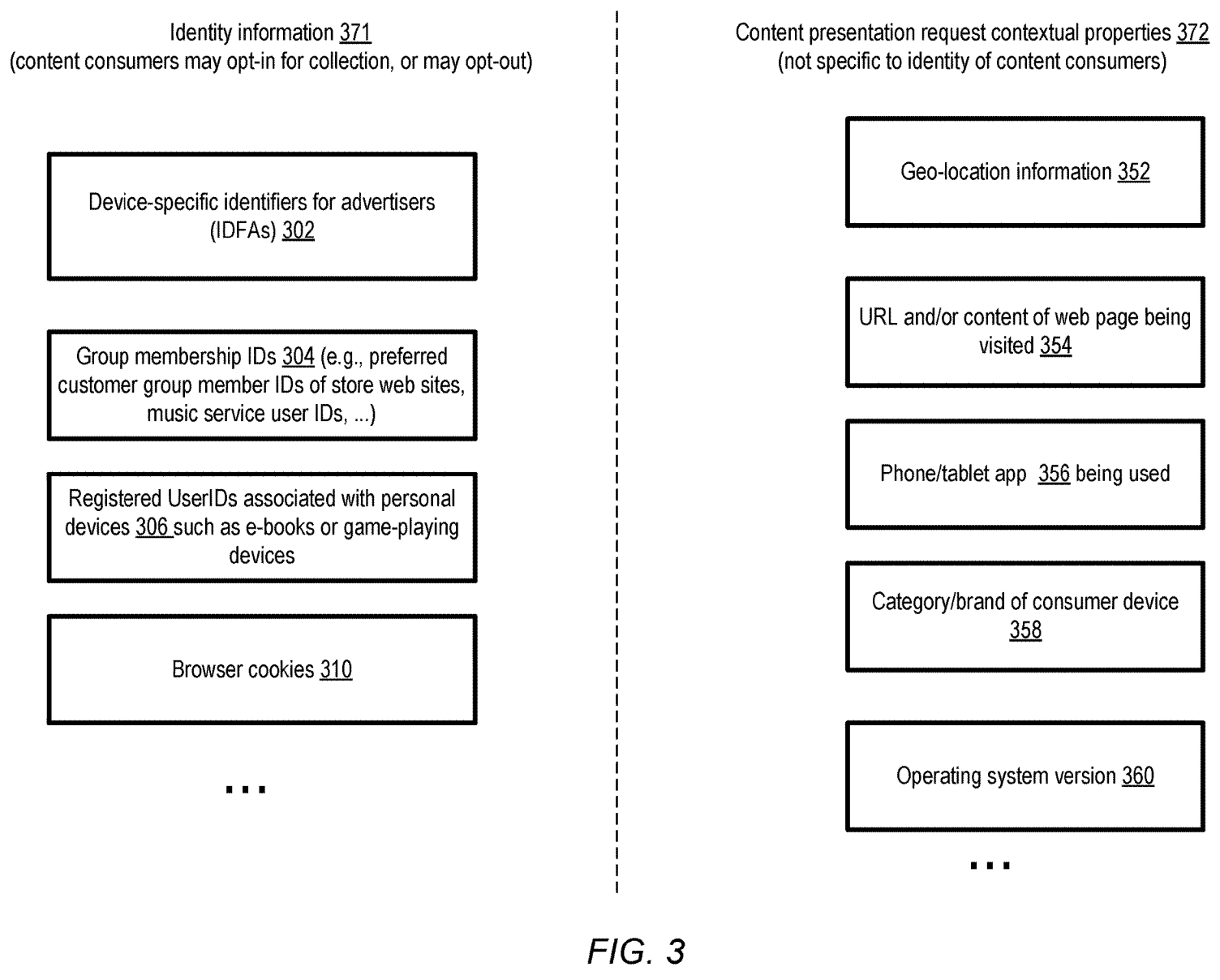

Content presentation request contextual properties 372
(not specific to identity of content consumers)

Geo-location information 352

URL and/or content of web page being visited 354

Phone/tablet app 356 being used

Category/brand of consumer device 358

Operating system version 360

...

Identity information 371
(content consumers may opt-in for collection, or may opt-out)

Device-specific identifiers for advertisers (IDFAs) 302

Group membership IDs 304 (e.g., preferred customer group member IDs of store web sites, music service user IDs, ...)

Registered UserIDs associated with personal devices 306 such as e-books or game-playing devices Browser cookies 310

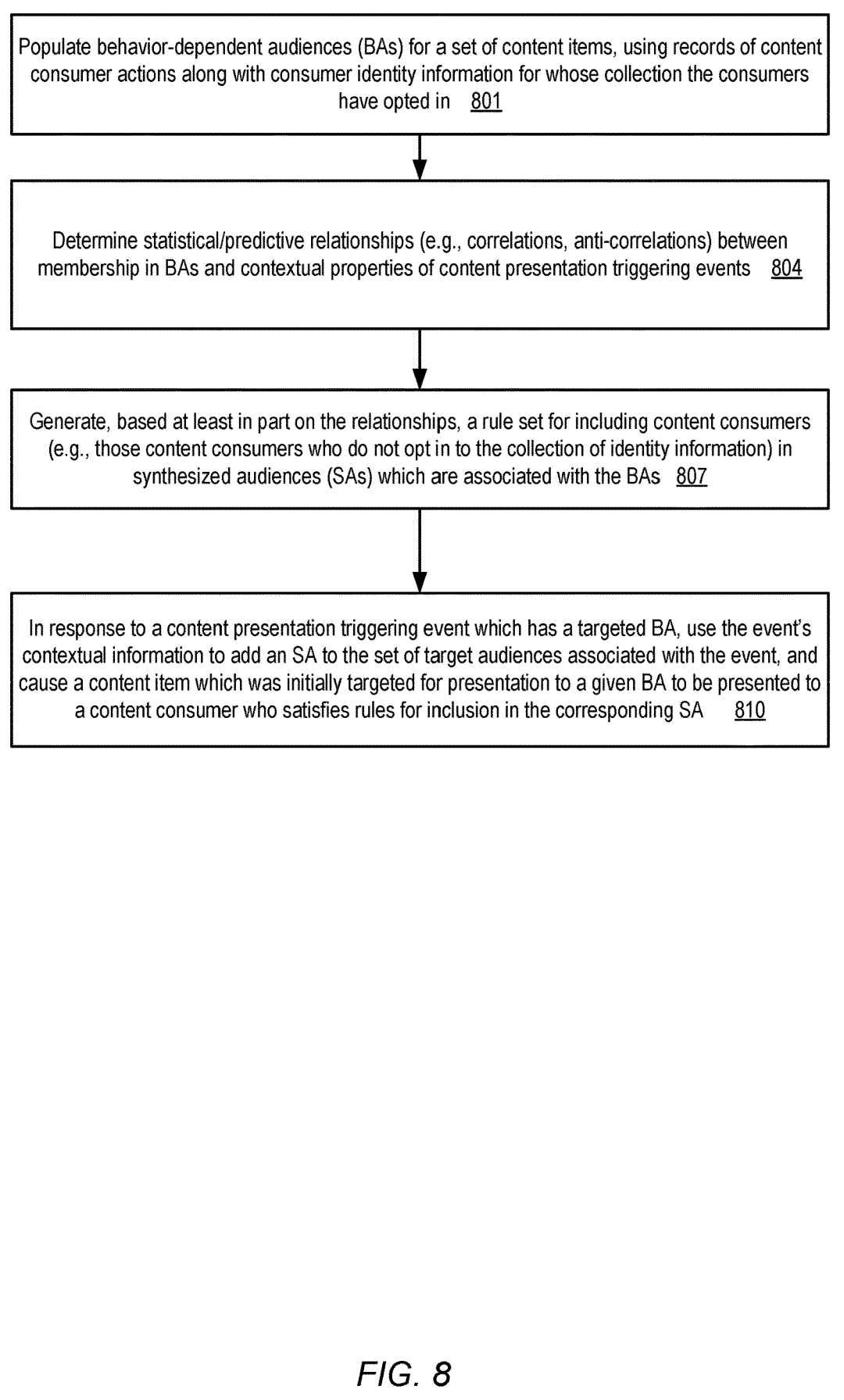

Populate behavior-dependent audiences (BAs) for a set of content items, using records of content consumer actions along with consumer identity information for whose collection the consumers have opted in   801

Determine statistical/predictive relationships (e.g., correlations, anti-correlations) between membership in BAs and contextual properties of content presentation triggering events   804

Generate, based at least in part on the relationships, a rule set for including content consumers (e.g., those content consumers who do not opt in to the collection of identity information) in synthesized audiences (SAs) which are associated with the BAs   807

In response to a content presentation triggering event which has a targeted BA, use the event's contextual information to add an SA to the set of target audiences associated with the event, and cause a content item which was initially targeted for presentation to a given BA to be presented to a content consumer who satisfies rules for inclusion in the corresponding SA     810

*FIG. 8*

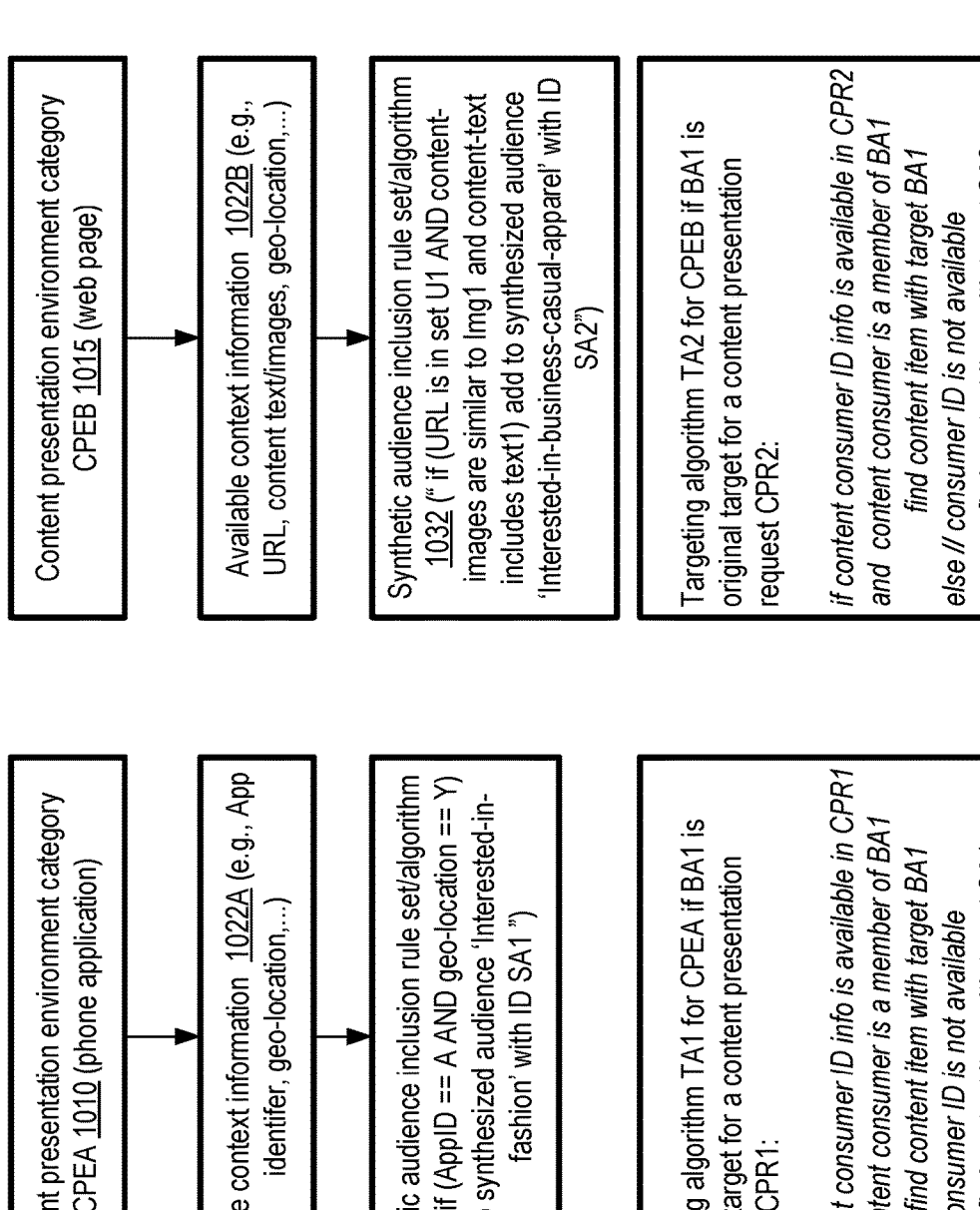

Content presentation environment category CPEB 1015 (web page)

Available context information 1022B (e.g., URL, content text/images, geo-location,...)

Synthetic audience inclusion rule set/algorithm 1032 (" if (URL is in set U1 AND content-images are similar to Img1 and content-text includes text1) add to synthesized audience 'Interested-in-business-casual-apparel' with ID SA2")

Targeting algorithm TA2 for CPEB if BA1 is original target for a content presentation request CPR2:

if content consumer ID info is available in CPR2
and  content consumer is a member of BA1
        find content item with target BA1
else // consumer ID is not available
        find content item with target SA2

Content presentation environment category CPEA 1010 (phone application)

Available context information 1022A (e.g., App identifer, geo-location,...)

Synthetic audience inclusion rule set/algorithm 1030 (" if (AppID == A AND geo-location == Y) add to synthesized audience 'Interested-in-fashion' with ID SA1 ")

Targeting algorithm TA1 for CPEA if BA1 is original target for a content presentation request CPR1:

if content consumer ID info is available in CPR1
and  content consumer is a member of BA1
        find content item with target BA1
else // consumer ID is not available
        find content item with target SA1

Behavior-dependent audience BA1 ("Frequent-business-apparel-buyer")

FIG. 10

SYNTHESIZED AUDIENCES FOR CONTENT ITEMS

BACKGROUND

Many large content presentation services, such as social media services, web-based store services and the like attempt to select and present content items that are likely to be of interest to their end users. Such content items (such as social media posts, news snippets, ads and the like) may have to be selected dynamically from very large item collections. The amount of information available at the content presentation service regarding the identity of a content consumer for whom a content item is to be selected for presentation may vary, for example based on the opt-in or opt-out preferences of the consumer, applicable regulations in a given jurisdiction, and/or on other factors. This can make the selection of content items that are well-matched to the content consumer somewhat challenging.

BRIEF DESCRIPTION OF DRAWINGS

FIG. 3 illustrates examples of content presentation request context information and consumer identity information which may be available to a content presentation service, according to at least some embodiments.

FIG. 8 is a flow diagram illustrating aspects of operations which may be performed to utilize context-based probabilistic rules to select content items for presentation to content consumers, according to at least some embodiments.

FIG. 10 illustrates examples of context-based content item matching algorithms which may be generated for a pair of content presentation environment categories, according to at least some embodiments.

Figure 1:
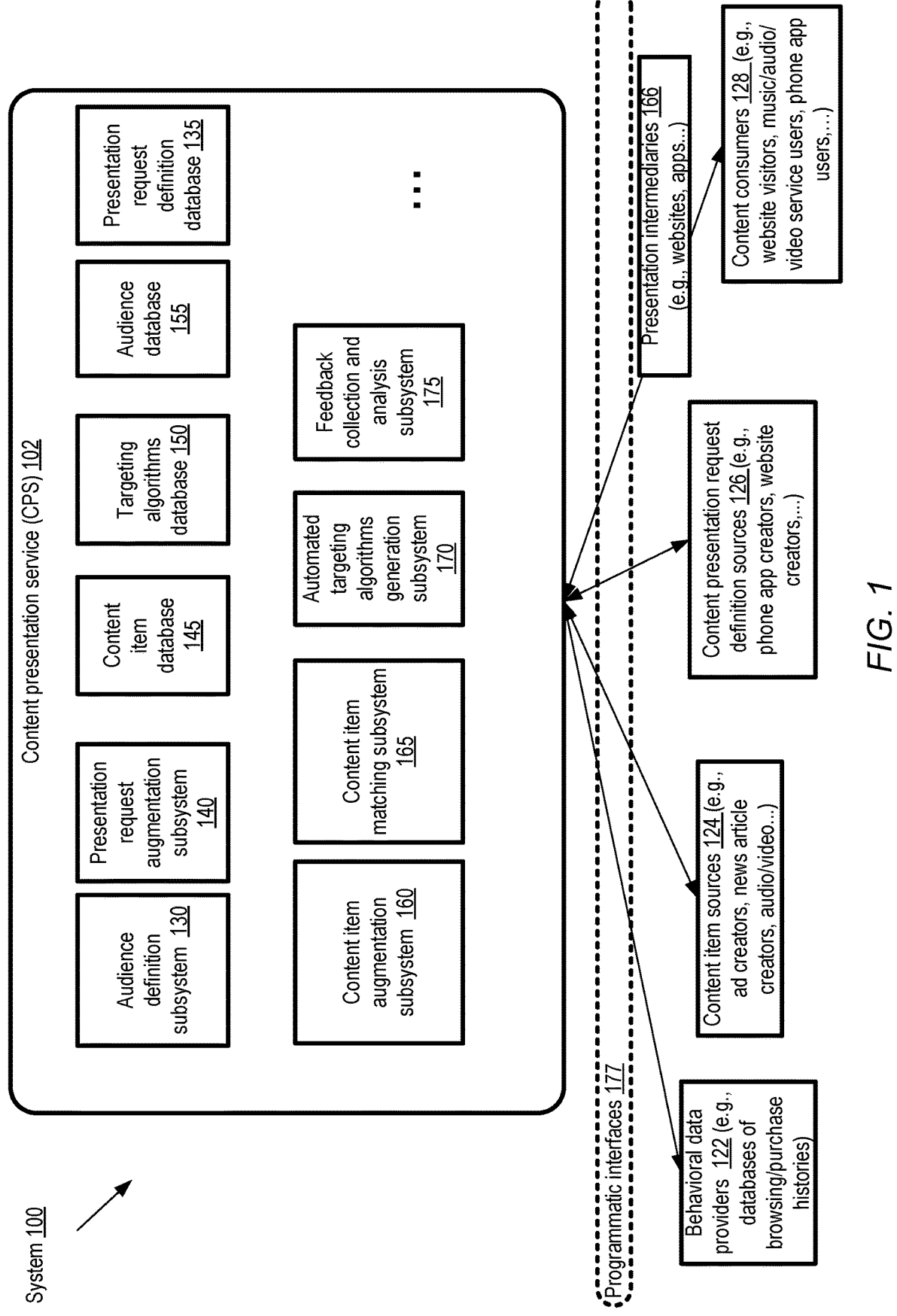
FIG. 1 illustrates an example system environment in which context-based probabilistic rules that are not dependent on availability of consumer identity information may be used at a content presentation service to select content items for presentation to at least some consumers, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof. Unless otherwise explicitly stated, articles such as "a" or "an" should generally be interpreted to include one or more described items throughout this application. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

DETAILED DESCRIPTION

The present disclosure relates to methods and apparatus for using probabilistic models and rules, derived from contextual information of content presentation triggering events (such as requests to view social media updates, ad requests generated from web pages or phone applications, etc.), to select content items for presentation to content consumers. The context information may be used, for example, instead of relying upon the availability of information identifying individual content consumers to whom the content items are to be presented. For example, based on the URL of a web site which a content consumer happens to be browsing, a content presentation service may be able to make some probabilistic assumptions regarding interests of the content consumer, and such probabilistic assumptions may be used to choose content items that are then (e.g., in a portion of the layout of a web page of the web site) displayed to that content consumer. Such probabilistic decisions may not require specific identity information of the content consumer; the same URL could be browsed by numerous content consumers concurrently, so the URL information does not uniquely specify any given content consumer. In many cases, at least a subset of content consumers may opt out of providing identity information if desired, e.g., using privacy controls or settings supported by operating systems, web sites or applications from which requests for content may be initiated, so the identity information may not even be accessible.

According to various embodiments, the following high-level steps may be implemented, e.g., at a content presentation service (CPS) of a provider network or cloud computing environment, to enable the intelligent use of context information for some content item presentations. A set of content consumers may be subdivided into behavior-dependent audiences or segments (e.g., audiences such as "fans of Basque food", "high-end fashion fans", "frequent fliers to Europe from North America in spring") based at least partly on the analysis of records of actions of those content consumers. The granularity at which the behavior-dependent audiences (which may also be referred to as behavioral audiences), can be defined may depend on factors such as the specificity of the information available in the records, the business objectives of the CPS clients on whose behalf the audiences are being populated, and so on. For example, in some cases a behavior-based audience based on travel records may be defined as "frequent international fliers" instead of "frequent fliers to Europe from North America in spring". The content consumers placed into the behavior-dependent categories may have opted in to allow identity information of one or more categories to be collected by one or more organizations with respect to their actions, such as membership identifiers in preferred-customer groups, registered user identifiers for proprietary devices (e.g., e-books) that the content consumers use for some of their actions, and so on. Behavior-dependent audience definitions may be provided to content item creators upon demand in some embodiments, enabling the content item creators to specify target behavior-dependent audiences for at least some of the content items managed by the CPS.

The CPS may determine relationships between membership in the behavior-dependent audience and a set of contextual properties of content presentation triggering events or requests, which can be used to infer similarities in interests between (a) content consumers which are not members of the behavior-dependent audience and (b) content consumers which are members of the behavior-dependent audience. For example, if a web site displays pictures of, or enables the purchase of, high-end clothing, a content consumer that frequently visits that web site may be assumed to have a reasonably high probability of being fond of high-fashion items, and in this sense being similar to content consumers that have been placed in a behavior-dependent audience labeled "high-end fashion fans". Note that such probabilistic inferences may be drawn for a given content consumer in some embodiments without analyzing records of actual purchases of high-fashion item or other such actions; had such action records (with associated identification information of the content consumer) been available, the consumer could have been placed with a higher degree of certainty in a behavior-dependent audience of high-end fashion fans.

Content consumers whose identity information is unknown at the time that a content item has to be selected for presentation for the content consumers may be referred to herein as unidentified or not-yet-identified content consumers. The corresponding requests or other types of triggering events for content items may be referred to as unidentified requests or unidentified triggering events in at least some embodiments. Using the inferred statistical or probabilistic relationships, one or more context-based rules may be generated in various embodiments for including unidentified content consumers within synthesized audiences (as opposed to behavior-dependent audiences, for which membership decisions may have been based on recorded events with content consumer identification information). For example, corresponding to a behavioral audience BA1 representing content consumers that are known to be interested in high-end clothing, context-based rules for including unidentified content consumers within a synthesized audience SA1 representing content consumers that are assumed to have a non-trivial probability of being interested in high-end clothing may be generated. Synthesized audiences may also be referred to as synthetic audiences, synthesized audiences, modeled audiences, inferred audiences, artificial audiences or context-based audiences in various embodiments. Context-based rules may be referred to as probabilistic rules in some embodiments, as they rely more on probabilistic classification of content consumers' future behaviors using statistical relationships than on analysis of completed actions of the content consumers.

In at least some embodiments, target audiences may be stored as part of the metadata associated with various content presentation triggering events. For example, an ad request (the triggering event) generated in response to a visit to a web page by an unidentified content consumer may have an associated set of behavior-dependent audiences (specified for example by the web page owner) as a target audience for the ad request. In response to the occurrence of a given content presentation triggering event, one or more synthesized audiences may be added to a set of target audiences of the event in some embodiments, based at least in part on a set of contextual properties of the event. For example, if a request for an ad is generated from a web page of a web site dealing with high-end clothing items, the example synthetic audience SA1 mentioned above may be automatically added to the set of target audiences for the ad request by the CPS. Furthermore, given the assumed relationship between the synthetic audience SA1 and the behavioral audience BA1, a content item for which BA1 has been specified as a target audience may be presented to a particular content consumer who satisfies a rule for inclusion in SA1 in at least some embodiments. Such a content item may be presented to the content consumer without obtaining identity information of the content consumer, and the content consumer may not have been designated as a member of BA1 in various embodiments. In effect, the content presentation service may be able to use its automatically generated rules for synthesized audiences to match content items probabilistically to a wider range of content consumers than would have been feasible if behavior-based selection of audiences were the only option available in such embodiments.

As one skilled in the art will appreciate in light of this disclosure, certain embodiments may be capable of achieving various advantages, including some or all of the following: (a) enabling a content presentation service to provide content items that are likely to be of greater interest to content consumers than may otherwise have been feasible, without obtaining details of identification information of the content consumers and/or analyzing identification-containing records of actions of the content consumers, and/or (b) enabling content item producers to become more successful in targeting their content items, which can in turn lead to increased demands for goods or services indicated in the content items.

According to some embodiments, a system may comprise one or more computing devices. The computing devices may include instructions that upon execution on or across the one or more computing devices generate a behavior-dependent audience based at least partly on analysis of a category of identity information associated with records of actions of a set of content consumers. The set of content consumers may have opted in to allow collection of the category of identity information. A statistical or predictive relationship between membership in the behavior-dependent audience and a set of contextual properties of content presentation triggering events may be learned (e.g., using machine learning models or other analytics tools) at the computing devices. One or more rules for including other content consumers into a synthesized audience may be generated automatically based at least in part on the relationship in various embodiments. In response to detecting a particular presentation triggering event, the synthesized audience may be added to a set of target audiences of the particular presentation triggering event, based at least in part on a particular contextual property of the event. A content item which was targeted to the behavior-dependent audience may be presented to a particular content consumer who satisfies a rule for inclusion in the synthesized audience, even though the particular content consumer has not been designated as a member of the behavior-dependent audience. The category of identity information which was used for generating the behavior-dependent audience may not be obtained.

Content items of a wide variety may be managed and targeted to content consumers with the help of a CPS in different embodiments, including but not limited to social media notification items, news articles or news article snippets/headlines, audio segments, videos, advertisements, or items presented via bidirectional interactive interfaces (such as gaming-related tokens or artifacts presented via a multiplayer game console). The kinds of devices at which the content items are presented by the CPS based on synthesized and/or behavior-based audiences may vary as well, and may include, for example, phones, mobile computing devices such as laptops or tablets, desktops, Internet-of-things (IoT) device such as smart home appliances, wearable computing devices, automated personal assistant devices, media streaming devices including televisions and the like, gaming consoles/devices or e-readers. Some of the content items may be presented via interactive interfaces in at least one embodiment as mentioned above, enabling a content consumer to send feedback (or user-generated content) back to the system if desired. In at least some embodiments, the category of the device at which a content item is to be presented in response to a triggering event may be included in the contextual information used to identify target audiences. Triggering events which lead to content item presentation may include, among others, accessing of a web page by a content consumer, accessing of a phone-based app, powering on or activating a device, logging on to a device, or initiating a media stream. In at least one embodiment a physical action taken by a content consumer or a set of consumers (such as walking in front of a physical storefront, or walking/driving/riding a bicycle in the vicinity of a restaurant), or a detected movement of a content consumer, may represent additional categories of content presentation triggering events. The kinds of identity information associated with consumer content actions that may be used to populate behavior-dependent audiences may include, for example, one or more of: user identifiers for access to a service (such as a music streaming service or a video streaming service), registered user identifiers of a networked device (such as a registered user of an e-reader affiliated with an organization providing e-books), a device-specific identifier for advertisers (IDFA), an organization membership identifier or a web browser cookie.

In at least some embodiments, machine learning models or other such analytics tools may be used for various tasks at the CPS, e.g., to generate the rules for including content consumers in synthesized audiences, to choose or modify the granularities at which synthesized audiences and/or behavior-dependent audiences should be defines, and so on. In various embodiments, then CPS may automatically enhance or augment metadata associated with content items, e.g., by adding synthesized audiences to the set of target audiences of various content items, without receiving a request from the content item owner or creator specifying the particular synthetic audiences to be added. In at least some embodiments, information about the synthesized audiences for which inclusion rules are generated at the CPS may be provided to content item creators, and the content item creators may be provided the opportunity to modify or augment their content items themselves by submitting programmatic requests to add selected synthesized audiences to the target audiences of the content items.

The combination of the logic used to map content presentation triggering events to audiences (e.g., using different combinations of contextual properties of the events to identify statistically generated synthesized audiences) and the logic used for selecting/matching individual content items to the content presentation triggering events (which may involve selecting from among several synthetic audience inclusion rule combinations, identifying approximate matches between synthesized audiences and behavior-dependent audiences, and/or selecting from among various content items that all have overlapping augmented target audiences) may be referred to collectively as targeting algorithms in various embodiments. In some embodiments, various targeting algorithms used by the CPS (which may be generated automatically at the CPS in some case, or specified at least in part by CPS clients using programmatic interfaces of the CPS) may each be assigned a respective algorithm identifier, and made accessible to CPS clients if desired. In at least one embodiment, respective resource budgets (e.g., including computation budgets associated with displaying or presenting content, and/or associated monetary amounts) may be specified by CMS clients, e.g., for specific content items and/or for respective targeting algorithms. Each time a given ad is displayed on a web page, for example, in accordance with one or more targeting algorithm used by the CPS, the available resources of a resource budget associated with the ad or the targeting algorithm may be reduced by a selected amount. The CPS may ensure, before causing a given content item to be presented using a given targeting algorithm, that the resource budget associated with the content item or the targeting algorithm has not been exhausted in embodiments in which such budgets are specified. If, for example, the budget associated with a given targeting algorithm TA1 is exhausted, the CPS may choose to use an alternate targeting algorithm TA2 that is also applicable, and select a content item indicated by TA2 for presentation.

In at least some embodiments, the CPS may also provide budget optimization functionality. For example, in a scenario in which respective resource budgets are assigned to individual targeting algorithms, the CPS may analyze the effectiveness of different targeting algorithms over time, and recommend changes to budgets or redistribution of the budgets. In various embodiments, the CPS may enable clients to in effect run experiments with different targeting algorithms, with different synthesized audiences and/or with different budgets. For example, clients may define targeting algorithms TA1, TA2, . . . , TA-n that use different combinations of context information to add respective synthesized audiences to content presentation triggering requests or to individual content items, assign respective initial budgets to the algorithms, and determine which algorithms work out best. Based on the results obtained (e.g., using various kinds of feedback, dependent for example on the objectives of the organization(s) on whose behalf the content is being presented), some targeting algorithms or synthesized audiences may be removed/deleted, budgets may be readjusted, and so on in such embodiments.

As mentioned above, in at least some embodiments a CPS may be implemented as one of a suite of services of a provider network or cloud computing environment. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet or a cellular communication network) and the hardware and software in cloud provider data centers that provide those services.

A cloud provider network can be formed as a number of regions, where a region is a separate geographical area in which the cloud provider clusters data centers. Such a region may also be referred to as a provider network-defined region, as its boundaries may not necessarily coincide with those of countries, states, etc. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network connecting each region to at least one other region. The cloud provider network may deliver content from points of presence outside of, but networked with, these regions by way of edge locations and regional edge cache servers (points of presence, or PoPs). This compartmentalization and geographic distribution of computing hardware enables the cloud provider network to provide low-latency resource access to customers on a global scale with a high degree of fault tolerance and stability.

The cloud provider network may implement various computing resources or network-accessible services, which may include, in addition to a CPS, a virtualized compute service (VCS), data processing service(s) (e.g., map reduce, data flow, and/or other large scale data processing techniques), data storage services (e.g., object storage services, block-based storage services, or data warehouse storage services), network function virtualization services or packet processing services, machine learning services (which may be used by the CPS) and/or any other type of network based services (which may include various other types of storage, processing, analysis, communication, event handling, visualization, and security services). The resources required to support the operations of such services (e.g., compute and storage resources) may be provisioned in an account associated with the cloud provider, in contrast to resources requested by users of the cloud provider network, which may be provisioned in user accounts.

Various network-accessible services may be implemented at one or more data centers of the provider network in different embodiments. Network-accessible computing services can include an elastic compute cloud service (referred to in various implementations as an elastic compute service, a virtual machines service, a computing cloud service, a compute engine, or a cloud compute service). This service may offer compute instances (also referred to as virtual machines, or simply "instances") with varying computational and/or memory resources, which are managed by a compute virtualization service (referred to in various implementations as an elastic compute service, a virtual machines service, a computing cloud service, a compute engine, or a cloud compute service). Compute instances may, for example, be used to perform various computations at a CPS, such as generating audiences, augmenting content items, augmenting content item presentation requests, generating and/or executing targeting algorithms in at least some embodiments. In one embodiment, each of the virtual compute instances may correspond to one of several instance types or families. An instance type may be characterized by its hardware type, computational resources (e.g., number, type, and configuration of virtualized central processing units (VCPUs or VCPU cores) and/or virtualized accelerator/GPUs, memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics (such as a "burstable" instance type that has a baseline performance guarantee and the ability to periodically burst above that baseline, or a non-burstable or dedicated instance type that is allotted and guaranteed a fixed quantity of resources). Each instance type can have a specific ratio of processing, accelerator, local storage, memory, and networking resources, and different instance families may have differing types of these resources as well. Multiple sizes of these resource configurations can be available within a given instance type. Using instance type selection functionality, an instance type may be selected for a customer, e.g., based (at least in part) on input from the customer. For example, a customer may choose an instance type from a predefined set of instance types. As another example, a customer may specify the desired resources of an instance type and/or requirements of a workload that the instance will run, and the instance type selection functionality may select an instance type based on such a specification. A suitable host for the requested instance type can be selected based at least partly on factors such as collected network performance metrics, resource utilization levels at different available hosts, and so on. As mentioned above, the resource sets used by an MLS for training models may comprise compute instances in at least some embodiments.

The traffic and operations of the cloud provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, or system state information). The data plane includes customer resources that are implemented on the cloud provider network (e.g., computing instances, containers, block storage volumes, databases, or file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks. Individual services including the CPS may include service-specific control plane resources as well as service-specific data plane resources in some embodiments.

FIG. 1 illustrates an example system environment in which context-based probabilistic rules that are not dependent on availability of consumer identity information may be used at a content presentation service to select content items for presentation to at least some consumers, according to at least some embodiments. As shown, system 100 comprises resources and artifacts of a content presentation service 102, including an audience definition subsystem 130, a presentation request augmentation subsystem 140, a content item augmentation subsystem 160, a content item matching subsystem 165, an automated targeting algorithms generation subsystem 170, and a feedback collection and analysis subsystem 175. The CPS 102 may also include a content item database 145, a targeting algorithms database 150, an audience database 155 and a presentation request definition database 135 in the depicted embodiment. Each of the subsystems and databases shown in FIG. 1 may comprise some combination of software and hardware of one or more computing devices.

The CPS may implement a set of programmatic interfaces 177, such as one or more web-based consoles, command-line tools, graphical user interfaces and the like. Such programmatic interfaces may be utilized by several categories of CPS clients to submit messages or requests to the CPS and obtain corresponding responses, and/or by CPS components to obtain information pertaining to content items. For example, the programmatic interfaces 177 may be used by behavioral data providers 122 (such as owners of databases of browsing or purchase histories of various content consumers that have opted in to enable collection of some categories of identification information) to provide records of actions of content consumers to the CPS 102 in the depicted embodiment. Such records of consumer actions, which may include identity information of the content consumers who performed the actions, may be utilized at audience definition subsystem 130 to classify the content consumers into behavior-dependent audiences (BAs) in various embodiments. Representations of the BAs may be stored within audience database 155.

The audience definition subsystem 130 may utilize analytics tools, including for example machine learning models, to identify statistical or predictive relationships between contextual properties of content presentation triggering events and membership of the BAs in the depicted embodiment. For example, if the audience definition subsystem is able to determine, based on records of content items that were displayed to members of a given BA BA1, that the members of BA1 spend substantial amounts of time on certain web sites, then the audience definition subsystem may be able to infer that unidentified content consumers that also spend large amounts of time on such web sites are likely to have similar interests as the members of BA1. The contextual information in this example may include the URLs of the web sites, and/or specific text or visual content of the web sites, and the corresponding content presentation triggering events may include ad requests (or requests for additional content to occupy a portion of a web page, such as a request for a related news item) generated from the web sites. Based on the statistical or predictive relationships, the audience definition subsystem 130 may define synthesized audiences (SAs) associated with BAs, and rules for including unidentified content consumers (with respect to whom identity information may not be available, and who may therefore not be eligible for inclusion in BAs) in the SAs. The SA definitions and inclusion rules may be stored in the audience database 155 in various embodiments. In at least one embodiment, information about the associations between SAs and BAs may also be stored in the audience database 155. For example, an indication of one or more SAs anticipated to be most similar (in terms of interests or behaviors) to a given BA may be stored with the BA's representation, and/or an indication of one or more BAs expected to be most similar to a given SA may be stored with the SA's representation.

Content item sources 124, such as creators of ads, creators of news items, audio/video etc. may provide the CPS with content items in the depicted embodiment via programmatic interfaces 177. The content items, along with associated metadata, may be stored in content item database 145. The metadata associated with a given content item may include a target set of audiences in at least some embodiments, indicating the types of content consumers to whom the content item sources want their content items to be presented. In some embodiments, the content item sources 124 may be provided access to the audience database 155, and may select BAs and/or SAs as part of the target audience for one or more of their content items. In at least one embodiment, the content item augmentation subsystem 160 may automatically add one or more SAs to the target audience of a given content item. For example, if the content item source chooses a BA BA1 as the target audience for a content item CI1, the content item augmentation subsystem 160 may add a synthesized audience SA1, which is expected to be similar to BA1, to the target audience for CI1. The augmented target audience information may be stored in the content item database in the depicted embodiment.

Definitions or descriptors of requests for selecting and presenting content items may be received at the CMS via programmatic interfaces from content presentation request/trigger sources 126, such as the creators/owners of web sites, phone applications and the like in the depicted embodiment. Such definitions may for example specify the content consumer actions that should trigger presentation of a matched content item by the CPS to the content consumers, and an indication of a target audience for the request. The presentation request definitions, along with associated metadata such as their target audiences (as selected for example by the content presentation request definition sources), may be stored in presentation request definition database 135 in the depicted embodiment. Corresponding to each such presentation request definition, numerous instances of actual requests may be received at the CPS, as and when content consumers take the corresponding actions such as browsing the web site or opening the phone app in the depicted embodiment. For at least a subset of such requests, contextual properties such as the URL of the web site, the name or identifier of the phone application, the geographical location of the content consumer to whom content is to be presented, the kind of device from which the request is generated, and so on may be available to the CPS at along with the request instance itself. The presentation request augmentation subsystem 140 may dynamically analyze the contextual information available at request time, and use the contextual information to augment the target audience of a request instance with one or more synthesized audiences in the depicted embodiment. The terminology "x is targeted to audience y" (where x may be a content presentation triggering event or a content item, and y may be behavioral audience or a synthesized audience) may be used herein as a shortened version of "metadata associated with x indicates that a target audience of x includes audience y".

Various types of actions of content consumers 128 may trigger the process of selecting content items to be presented to them by the CPS in the depicted embodiment based on the content presentation request/trigger event definitions. For example, when a consumer accesses a web page that has slots for ads to be dynamically identified, or when a consumer opens/activates a phone app, or when a consumer switches on a device, the triggering action taken by the consumer, as well as context information pertaining to the triggering action, may be obtained at the CPS as part of a content presentation request. The presentation request augmentation subsystem 140 may analyze the context information available, and use to add one or more synthesized audiences to the target audiences of the presentation request in at least some embodiments. In effect, the content consumer whose action triggers the content item presentation request may be implicitly placed in a synthesized audience for the request in such embodiments, even though the identity of the content consumer may not be known to the CMS, because the context-based rules identified by the CPS for the synthesized audience are satisfied by the content consumer.

The augmented request may be obtained at the content item matching subsystem 165. A search of the content item database may be conducted by the content item matching subsystem for items whose target audience includes at least some of the audiences of the augmented request, and a matching content item (if found) may be presented to the content consumer 128 via the programmatic interfaces 177 in the depicted embodiment. In some cases, the target audience of the matching content item may include a behavior-dependent audience to which the content consumer has not been added, e.g., because detailed identity information of one or more categories may not be available for the content consumer, and such identity information may have been required to place content consumers into behavior-dependent audiences. Given the statistical or predictive relationships identified by the CPS for the contextual information, which led to the formulation of synthesized audiences assumed to be similar to behavior-dependent audiences, the CPS may thus be able to present content that is likely to be of interest to a wider set of content consumers than if only behavior-dependent audiences were used in the depicted embodiment. In some embodiments, the requests for content item presentation may be sent to the CPS via presentation intermediaries 166 (e.g., websites, phone apps, devices such as e-readers etc.). The content items selected by the CPS may be provided by the CPS to the intermediaries, and the intermediaries may in turn present the content items to the content consumers.

In at least some embodiments, there may be more than one synthetic audience to which the context properties of a content item presentation trigger or request may be mapped, and there may be more than one rule which can therefore be applied to place a content consumer among synthesized audiences. In some cases one subset of the context information of a given triggering event may point to inclusion of one group of additional audiences, while another subset of the context information of a given triggering event may point to inclusion of a different group of additional audiences. Techniques for handling/resolving such multiple and potentially conflicting rules may be implemented using a set of targeting algorithms stored in a targeting algorithms database 150 in the depicted embodiment. At least some of the targeting algorithms may be generated automatically in the depicted embodiment, e.g., at automated targeting algorithms generation subsystem 170. Furthermore, in some cases, there may not be exact matches between the synthesized audiences identified for a content item presentation request, and the set of audiences specified as targets for content items. For example, a synthesized audience may comprise content consumers expected to be "frequent travelers", while content items such as ads for respective airlines may have target audiences such as "frequent travelers between North America and Europe" or "frequent travelers between Europe and the Caribbean" or "frequent ocean cruise passengers". In such a scenario, approximate matches may have to be identified instead of exact matches between the synthesized audiences and the target audiences of the content items. Targeting algorithms stored in database 150 may also be used to perform such approximate matches in some embodiments. In at least one embodiment, content item sources and/or content presentation request definition sources may assign respective resource budgets to respective targeting algorithms and/or to respective content items, and the CPS may ensure that sufficient available resources from the budget are available before presenting the content items and/or using the targeting algorithms to select the content items.

In the depicted embodiment, feedback regarding the success (e.g., as evidenced by subsequent actions taken by the content consumers to whom the content items were presented, such as purchases of advertised items, or the amount of engagement time spent on the presented content items or linked content items) may be obtained and analyzed at feedback collection and analysis subsystem 175 of the CPS. The results of the feedback analysis may be used, for example, to rank targeting algorithms relative to one another, to modify synthesized audience definitions and inclusion rules, and so on in some embodiments.

Figure 2:
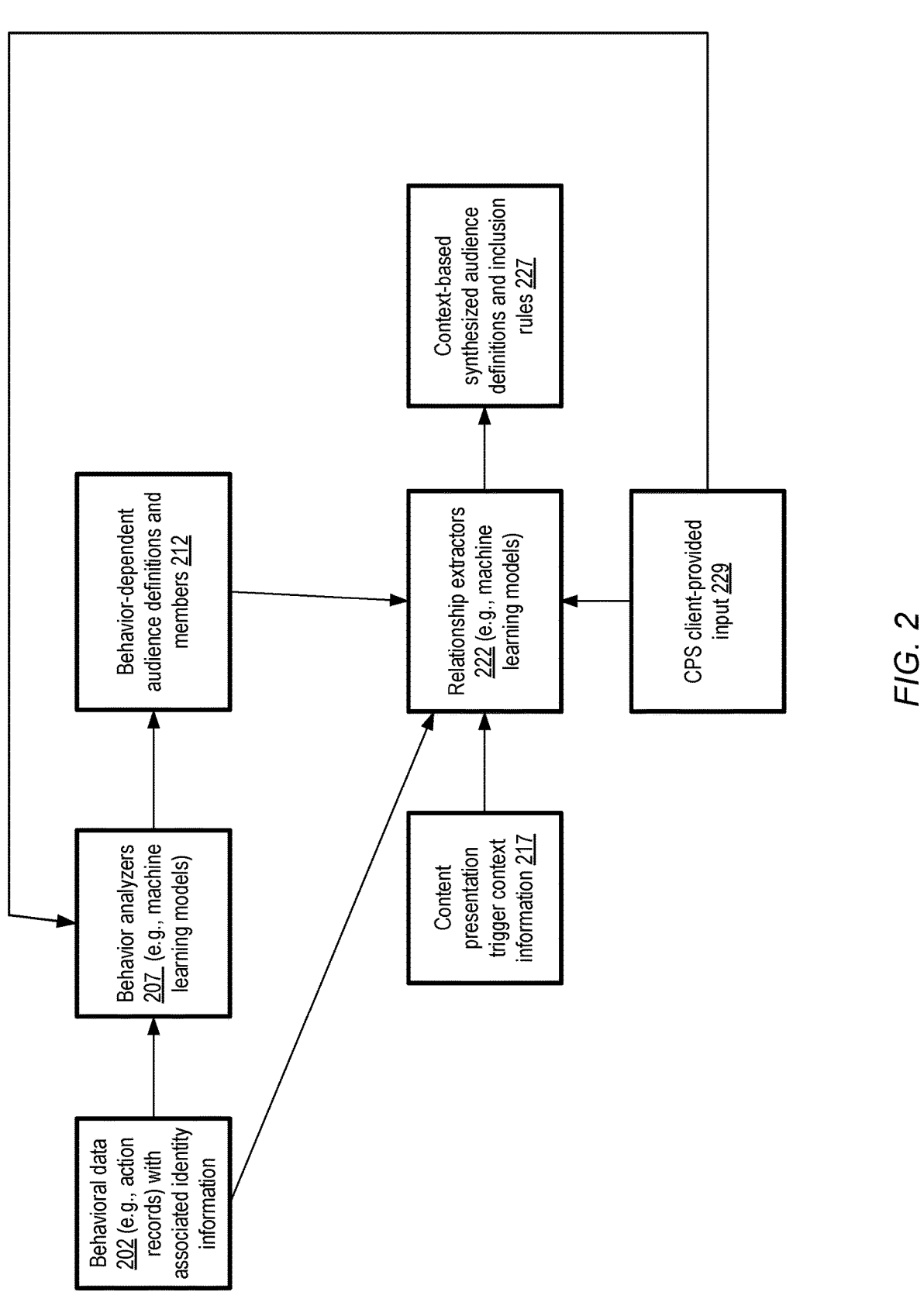
FIG. 2 illustrates an overview of an example technique to generate rules for including consumers in synthesized audience using context information associated with content presentation triggers, according to at least some embodiments.

FIG. 2 illustrates an overview of an example technique to generate rules for including consumers in synthesized audience using context information associated with content presentation triggers, according to at least some embodiments. Behavioral data 202 with associated identity information of various content consumers who have opted in to collection of their identity information may be obtained at behavior analyzers 207, e.g., at an audience definition subsystem of a CPS similar to CPS 102 of FIG. 1. The behavioral data may for example include records of actions such as purchases of items, records of the presentation of content items earlier to the content consumers, records of browsing web sites, and so on. Using any of a variety of algorithms, and/or based on CPS client-provided input, a set of behavior-dependent audiences or segments definitions and corresponding members 212 may be identified in the depicted embodiment. The CPS client-provided input may include, for example, indications of the granularities at which the audiences should be defined, the total number of behavior-dependent audiences to be defined, the minimum number of behavior-dependent audiences to be defined on behalf of a given client such as a content item creator organization, the minimum membership counts for the audiences etc.

Information about the behavior-dependent audiences 212, behavioral data 202, and content presentation trigger context information 217 may be consumed as input by a set of statistical relationship extractors 222 of the CPS (e.g., at an audience definition subsystem) in the depicted embodiment. The relationship extractors may identify or infer relationships between context properties and membership in the behavior-dependent audiences, and use these relationships to generate context-based synthesized audience definitions and inclusion rules 227 for such audiences. In some embodiments, CPS clients such as content item creators may also provide input 229 to guide the process of generating the synthesized audiences, e.g., by indicating limits on the numbers of synthesized audiences to be generated, the minimum number of context elements to be used for each such definition, and so on. The synthesized audiences may be used by the CPS to augment content items' target audiences and/or content presentation requests' target audiences in at least some embodiments.

FIG. 3 illustrates examples of content presentation request context information and consumer identity information which may be available to a content presentation service, according to at least some embodiments. Identity information 371 may or may not be available to a CPS similar to CPS 102 of FIG. 1 in different embodiments for a given content consumer, depending on whether the content consumer opts in or opts out to the collection of the identity information. Examples of the kinds of identity information which may be available, and may potentially be used to populate behavior-dependent audiences as described above, may include device-specific identifiers for advertisers (IDFAs) 302, group membership IDs 304, registered userIDs associated with personal devices 306, browser cookies 310 and the like. Note that in at least some embodiments the identity information may not necessarily include the name or personal identification information of the content consumer, but may rather identify the devices that are frequently used (and in some cases used almost exclusively) by the content consumer, and may thus be closely tied to individual content consumers. The group membership information may include, for example, member IDs of preferred customer groups, music service user IDs, etc. The personal devices with associated registered UserIDs may include, for example, e-books, game-playing consoles or devices, automated personal assistant devices, and the like.

Content presentation request contextual properties 372, also referred as content presentation triggering event contextual properties, may not be tied to the identities of content consumers per se in various embodiments. The properties may include, for example, geo-location information 352 (e.g., the approximate location of a device from which a content presentation request originates, as estimated using Internet Protocol (IP) addresses or the like). Uniform Resource Locators (URLs) and/or content of a web page being visited 354, for which an additional content item is to be selected for display, may represent another example of a contextual property. The name of the phone or tablet app 356 being used when the request for presenting a content item is generated may be included in the contextual information in some embodiments. The category or brand of the consumer device 358 being used may be provided as part of the context of a content presentation request in some embodiments. The version of the operating system 360 in use at the device may be included among the contextual properties in at least some embodiments. Other types of identity information 371 and/or context properties 372 may be used at a CPS in some embodiments than those shown in FIG. 3.

Figure 4:
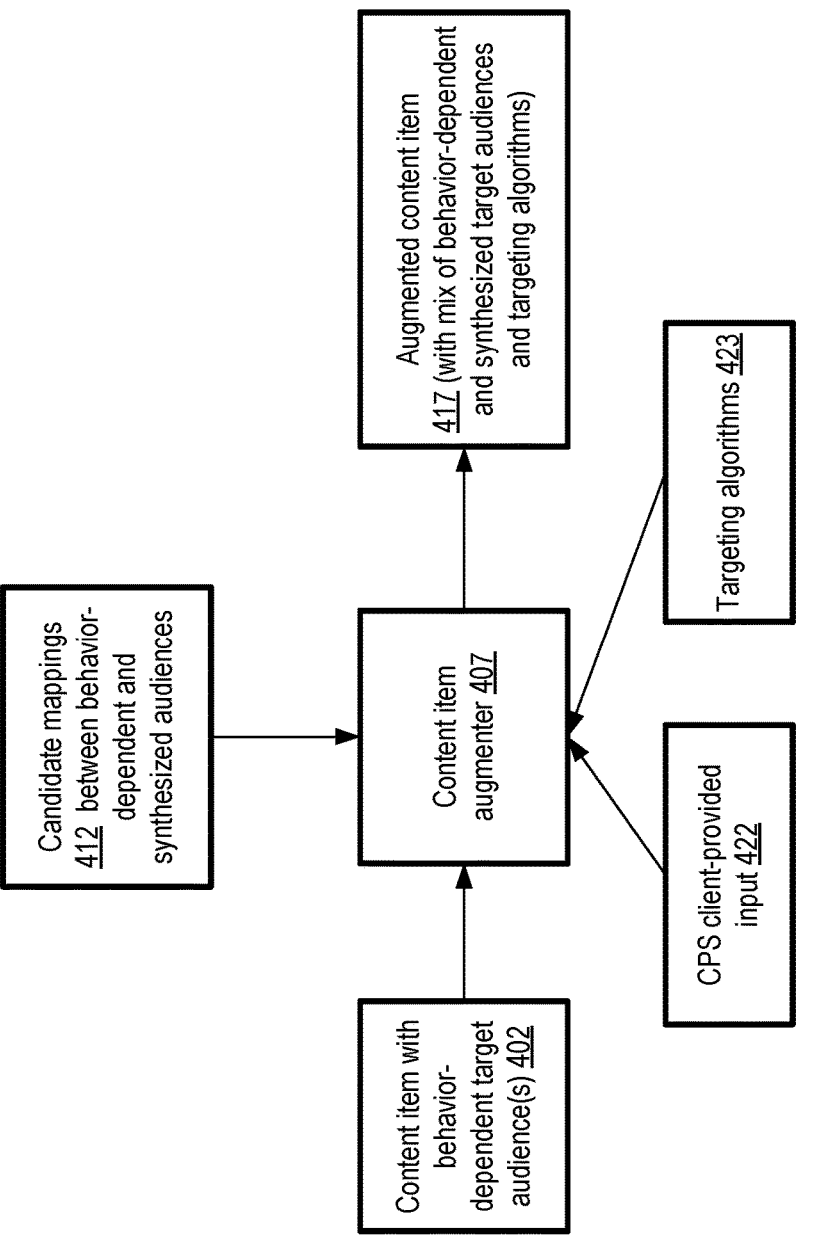
FIG. 4 illustrates an overview of an example technique for augmenting content items at a content presentation service to improve targeting of the content items, according to at least some embodiments.

FIG. 4 illustrates an overview of an example technique for augmenting content items at a content presentation service to improve targeting of the content items, according to at least some embodiments. Input to a content item augmenter 407 (e.g., a program running within a content augmentation subsystem of a CPS similar to CPS 102 of FIG. 1) may include a content item with a set of behavior-dependent target audiences 402 in the depicted embodiment. The content item augmenter 407 may use candidate mappings 412 between behavior-dependent and synthesized audiences to generate an augmented version of the content item 417 (e.g., with a mix of behavior-dependent and synthesized audiences as the target audience) in the depicted embodiment. The mappings 412 may be stored, for example, as part of the audience database at a CPS.

In some cases, mappings may be stored between a given behavior-dependent audience and several different synthesized audiences, and a set of targeting algorithms may be used to decide which audiences should be added as part of the target audience for a given content item. Respective targeting algorithms 423 may result in several different augmented versions of a content item in some embodiments. The CPS may store not only the augmented version of a content item, but also an indication of the specific targeting algorithm used for that version in some embodiments. Such metadata may be used, for example, to compare the effectiveness of different targeting algorithms over time at the CPS. In at least some embodiments, CPS-client provided input 422 may be used to guide the actions of the content item augmenter 407—for example, a content item owner may select or specify particular synthesized audiences for inclusion in the target audience.

Figure 5:
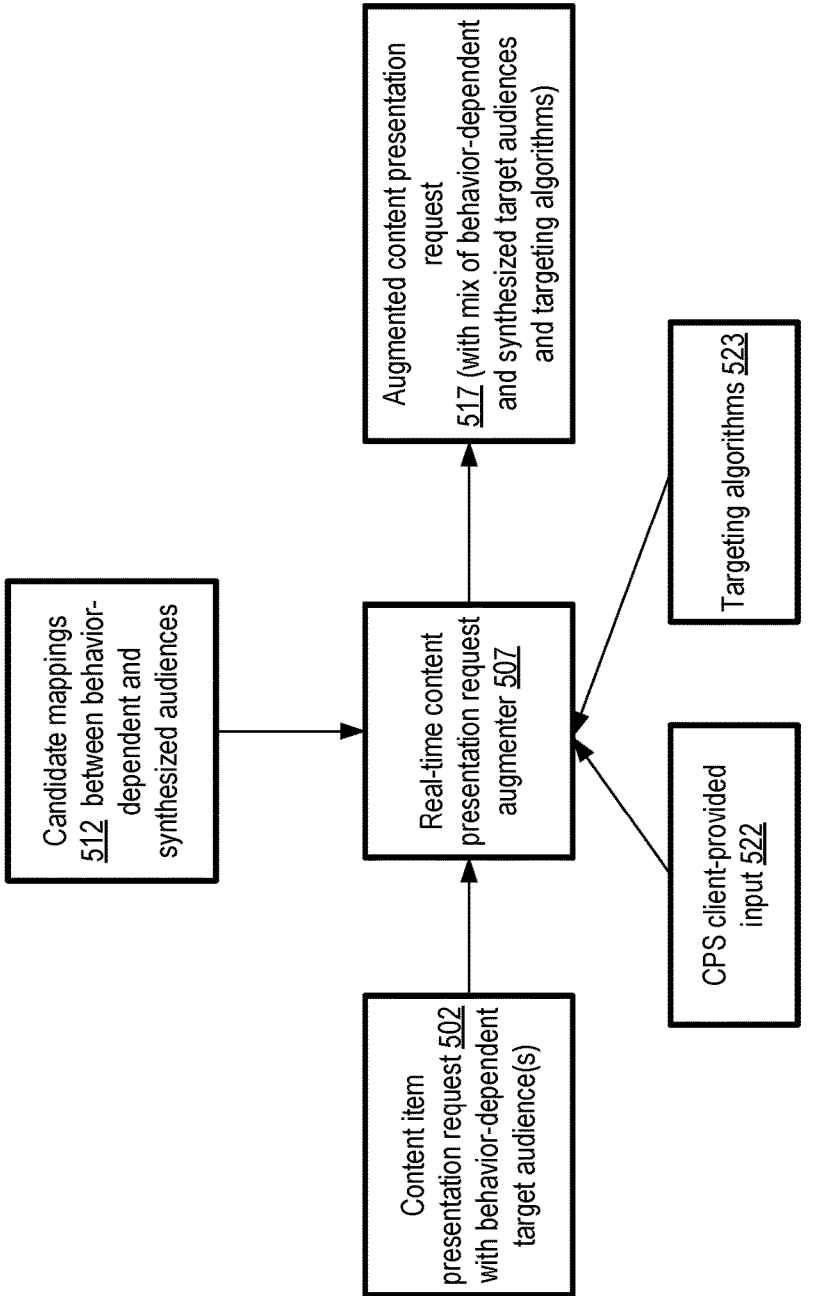
FIG. 5 illustrates an overview of an example technique for augmenting content presentation requests at a content presentation service to improve the selection of the content items that are presented in response to the requests, according to at least some embodiments.

FIG. 5 illustrates an overview of an example technique for augmenting content presentation requests at a content presentation service to improve the selection of the content items that are presented in response to the requests, according to at least some embodiments. A CPS may comprise one or more real-time content presentation request augmenters 507, e.g., with each augmenter comprising a set of programs running as part of a presentation request augmentation subsystem. The augmenter 507 may be described as "real-time" in the depicted embodiment because content items may have to be selected within a very short time interval (e.g., a few milliseconds) of the occurrence of a triggering event. When a content consumer clicks on the URL of a web page that has a slot available for an ad, for example, a matching ad may have to be identified for the content consumer and displayed very quickly to provide an acceptable user experience to the content consumer.

The real-time content presentation request augmenter 507 may utilize candidate mappings 512 between behavior-dependent and synthesized audiences to augment the target audience of a content item presentation request in the depicted embodiment. The presentation request 502 may have a set of behavior-dependent audiences specified as its target audience, e.g., including audiences identified by the owner of the web page or app from which the request originates. The target audience may be enhanced by adding one or more synthesized audiences, and the augmented content presentation request 517 may be passed on to a content item matcher in at least some embodiments.

As mentioned earlier, in some cases there may be multiple synthesized audiences that can be added to the target audience for a content item presentation request, e.g., based on different subsets of context information available. A set of targeting algorithms 523 may be used to select specific combinations of synthesized audiences for augmentation in the depicted embodiment. Information about the specific targeting algorithm that was used for a given augmented request may be logged in some embodiments and/or included in then augmented request itself. Such algorithm information may be used to evaluate the effectiveness of the targeting algorithm later, e.g., based on the effectiveness of the augmentation as inferred from subsequent actions of the content consumer. In some embodiments, CPS-provided client input 522 may also be used to augment the content presentation requests—for example, a website owner or an ad creator may request that no more than K synthesized audiences be added to the target audience of an ad request for a web page.

Figure 6:
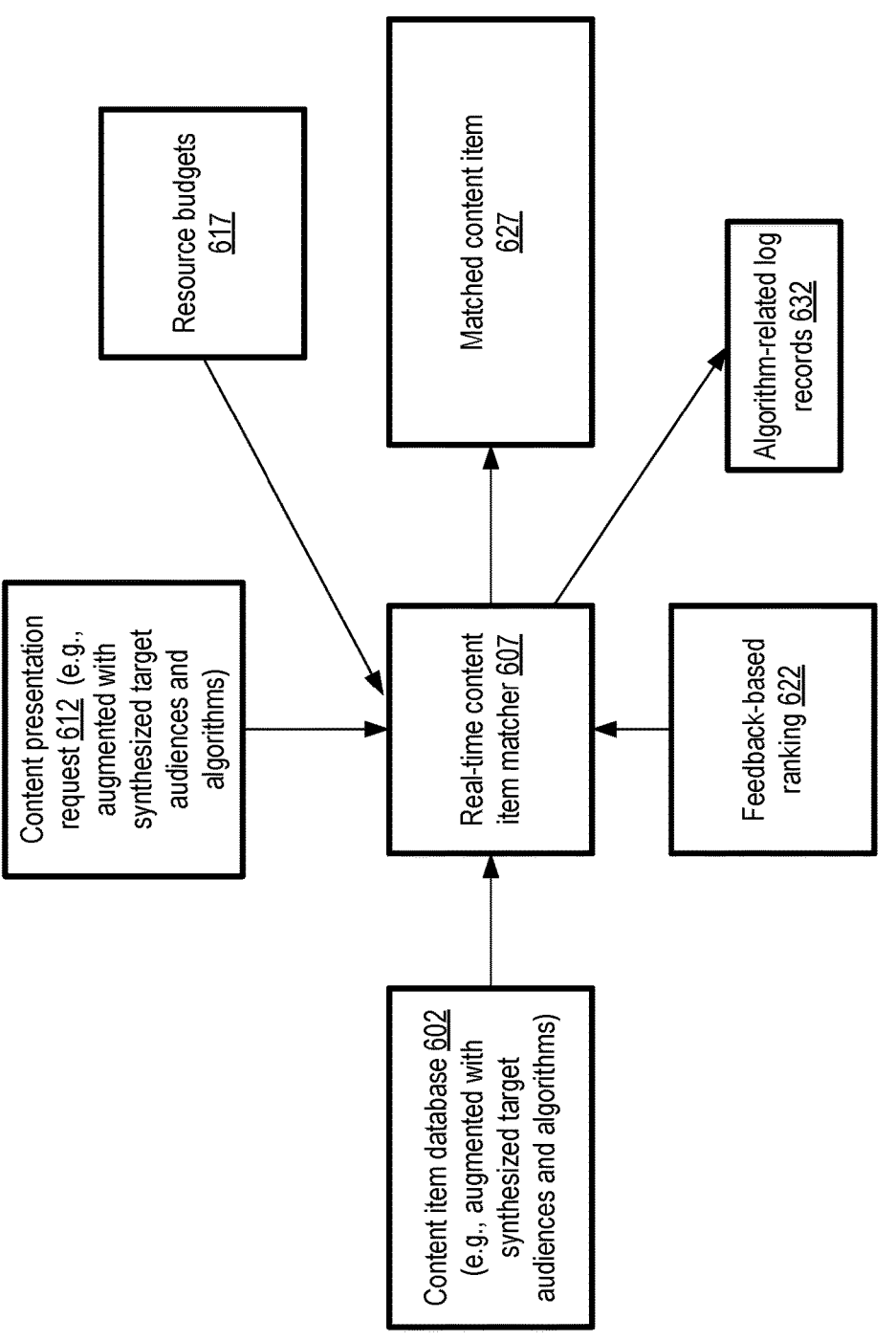
FIG. 6 illustrates an overview of an example technique for matching content items to presentation requests, according to at least some embodiments.

FIG. 6 illustrates an overview of an example technique for matching content items to presentation requests, according to at least some embodiments. A CPS similar in features and functionality to CPS 102 of FIG. 5 may include one or more real-time content item matchers 607 in the depicted embodiment, responsible for identifying specific content items to be displayed or presented to a content consumer. A content presentation request 612 for which a matching content item is to be found may be provided as input to the content item matcher in the depicted embodiment. An indication of a target audience for the content presentation request may also be obtained at the content item matcher, along with an indication of one or more targeting algorithms to be used for fulfilling the request in some embodiments. The target audience may include, for example, one or more synthesized audiences (which may have been added to the target audience by the CPS using any of several different targeting algorithms) and/or one or more behavior-dependent audiences that were chosen for the content presentation request, e.g., by the owner of a web page or other content presentation environment for which the request was generated.

Given the information about the content presentation request, the real-time content item matcher 607 may conduct a search of the content item database 602 maintained by or accessible from the CPS in the depicted embodiment. The database may contain information about the target audiences of its content items (including synthesized audiences which may have been added as targets by the CPS itself, as well as IDs of targeting algorithms used). A number of indexes may be maintained on the content item database, including for example indices based on the synthesized and/or behavior-dependent audiences that are part of the content items' target audiences, and such indexes may be utilized to identify the content items that match the content presentation request's target audience in some embodiments. In at least some embodiments, the results of the search may indicate that a number of different content items match the presentation request, and/or that a number of different targeting algorithms are associated with the content items that match the presentation request.

In at least one embodiment, in such scenarios, information may be available to the real-time content item matcher regarding resource budgets 617 associated with individual content items and/or with individual targeting algorithms. In such embodiments, before choosing a particular content item for presentation to the content consumer, the real-time content item matcher may ensure that sufficient budget remains for displaying/presenting the content item, and/or that sufficient budget remains for the targeting algorithm that led to the identification of the particular content item. In at least some embodiments, if a given content item that was found as a potential match for the target audience of the request has several different targeting algorithms stored for it, a single algorithm (with a sufficient remaining resource budget) may be selected as the algorithm which is credited with the selection of the content item, and a record of that targeted credited algorithm may be stored at the CPS. The evaluation of numerous different applicable algorithms may be conducted in parallel in some embodiments at the real-time content item matcher. Different algorithms may be ranked with respect to one another using a number of metrics to select the "winning" algorithm in some embodiments, such as effectiveness metrics of presenting content items earlier using the algorithms. Such feedback-based ranking 622 of different algorithms and/or different content items may change over time as more feedback about the algorithms becomes available.

In various embodiments, the following technique may be implemented by the real-time content item matcher 607 to select candidate content items to be displayed in response to the content presentation request 612. An intersection between two sets of targeting algorithms may be computed. The first set TAS1 may comprise targeting algorithms used to annotate or add synthesized audiences to the target audience of the content presentation request; such algorithms may for example differ from one another in the specific combinations of context information used to add synthesized audiences, the logic (e.g., Boolean logic) used to combine the context information, the names of the synthetic audiences, and/or other factors. The second set of targeting algorithms TAS2 may comprise targeting algorithms used to add synthesized audiences (using some or all of the context information of the kind available with respect to the content presentation request) to the target audience of a given content item; such algorithms may also differ from one another in the specific combinations of context information used to add synthesized audiences, the logic used to combine the context information, the names of the synthetic audiences, and/or other factors. If the intersection of the two sets is non-null, one of the algorithms of the intersection may be selected as the winning algorithm on the basis of which that content item is selected for presentation. For example, if TAS1 includes targeting algorithms A, B, C, D and E for a content presentation triggering event, while TAS2 for a given content item Cl includes targeting algorithms C, E, F, G and H, the intersection would consist of C and E, and one of the two algorithms C and E may be chosen as the winning algorithm. In some cases, respective budgets associated with the targeting algorithms, and/or feedback-based ranking 617 among the algorithms, may be used to select the winning algorithm from the intersection. Respective records of the members of the intersection, and the winning algorithm, may be stored in a collection of algorithm-related log records 632 in some embodiments. These records may be provided (e.g., upon request) to clients of the CPS via programmatic interfaces in some embodiments (such as content item creators or content presentation request sources), enabling the clients to determine how often various targeting algorithms were used. Using such information, some targeting algorithms may be improved or enhanced over time by the clients if desired, or some targeting algorithms may be discarded.

For some content presentation requests, a real-time content item matcher may not necessarily find a content item with an exact match with respect to a target audience of the request in some embodiments. In such cases, an approximate matching algorithm (e.g., using one or more machine learning models) may be conducted, and the content items whose target audiences have the greatest similarity (e.g., based on semantic interpretation of the titles of the audiences, and/or based on the extent of overlaps of behavior-dependent audiences) may be selected as candidates for presentation. In some embodiments, respective bids (e.g., payments that the content item creators are willing to make to the CPS for presenting their content items) may also be used in the process of identifying a particular content item for presentation in response to a presentation request. After the real-time content item matches has identified a particular item as the best match given all the factors being considered, that matched content item 627 may be presented to the content item consumer whose action resulted in the content presentation request in the depicted embodiment. As mentioned above, the matched content item may have to be identified in a very short amount of time (e.g., a few milliseconds) in various embodiments so as not to disrupt the user experience of the content item consumer. In at least one embodiment in which ads are among the content items being presented, the real-time content item matcher may be referred to as an ad server.

Figure 7:
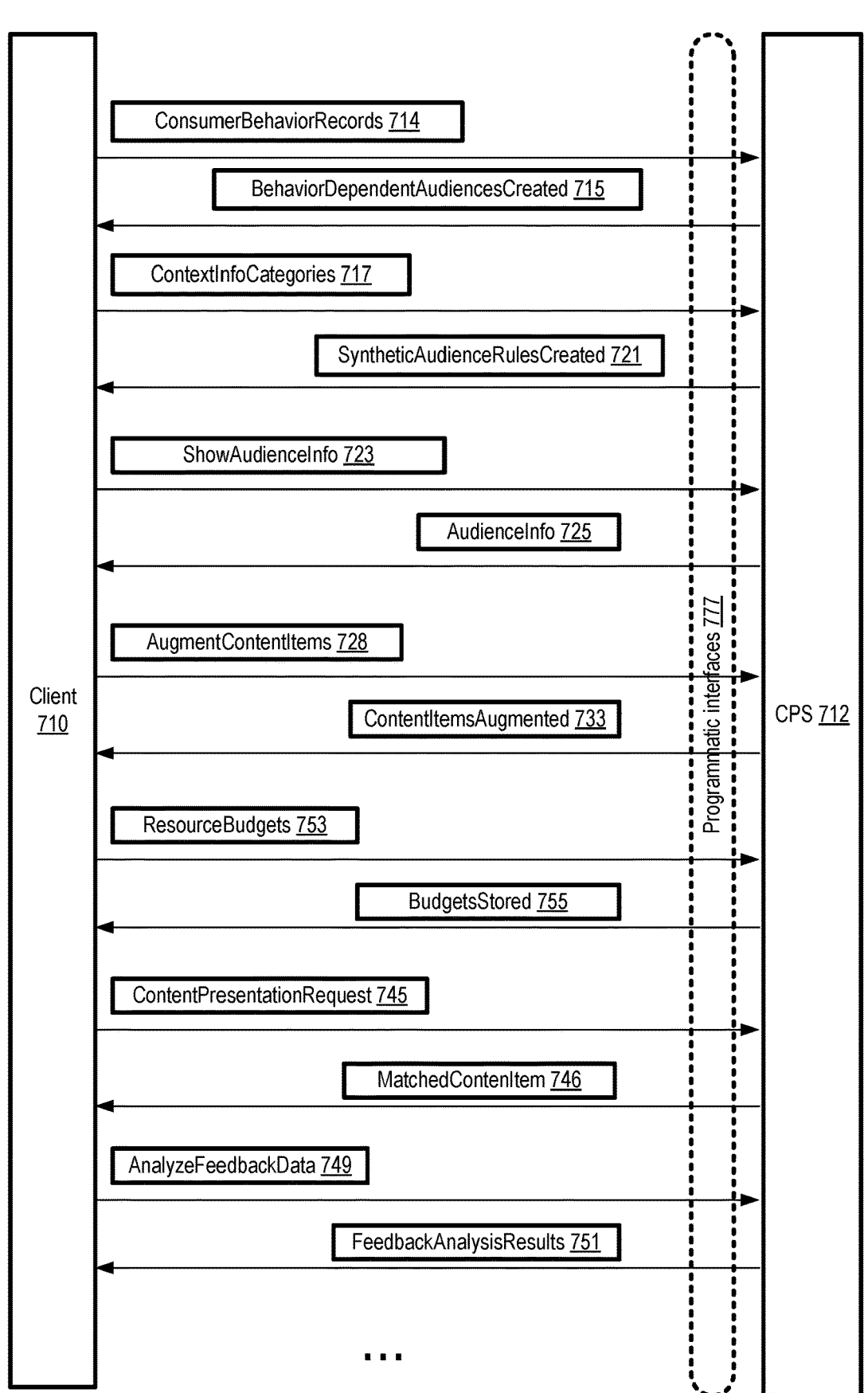
FIG. 7 illustrates example programmatic interactions associated with enhanced selection of content items for presentation using probabilistic rules at a content presentation service, according to at least some embodiments.

FIG. 7 illustrates example programmatic interactions associated with enhanced selection of content items for presentation using probabilistic rules at a content presentation service, according to at least some embodiments. A CPS 712 similar in functionality to CPS 102 of FIG. 1 may implement a set of programmatic interfaces 777 in the depicted embodiment, such as one or more web-based consoles, command-line tools, application programming interfaces (APIs), graphical user interfaces and the like. Several different categories of clients of the CPS, including for example content item creators/sources (e.g., ad creators), content presentation environment owners or intermediaries (such as website owners, phone app owners etc.) may utilize the programmatic interfaces to interact with the CPS in the depicted embodiment. All these different categories of clients are represented by a single element (client 710) of FIG. 7 to avoid clutter.

A client 710 may submit a ConsumerBehaviorRecords message 714 via programmatic interfaces 777 to the CPS 712 in the depicted embodiment, indicating one or more sources from which records of content consumer actions, along with identification information of the content consumers which can be used to populate behavior-dependent audiences of the kind discussed above, can be obtained. The CPS may utilize the behavior information, classify the content consumers whose records were provided into a number of behavior-dependent audiences, and send a BehaviorDependentAudiencesCreated message 715 to the client.

Clients may provide information to the CPS about the different kinds of context information which should be used to create synthesized or modeled audiences, e.g., using a ContextInfoCategories message 717. The CPS may utilize analytics tools such a machine learning models to identify statistical/predictive relationships between various combinations of context properties and membership in the behavior-dependent audiences, and use the relationships to generate rules for including unidentified content consumers (e.g., consumers about whom it is known that a content item is to be presented, but whose identities are not necessarily known) within synthesized audiences corresponding to the behavior-dependent audiences. A SyntheticAudienceRulesCreated message 721 may then be sent to the client in some embodiments.

A client may submit a ShowAudienceInfo request 723 in some embodiments to view the behavior-dependent as well as synthesized audiences that have been defined at the CPS. The list of audiences and their associations with one another (e.g., which synthesized audiences are assumed/expected to be similar to a given behavior-dependent audience) may be presented to the client via one or more AudienceInfo messages 725 in the depicted embodiment.

An AugmentContentItems request 728 may be submitted by a client to request that synthesized audiences be added to the target audiences of specified content items in the depicted embodiment. The CPS may augment the content items and send a ContentItemsAugmented message 733 to the client. In some embodiments, the client 710 may not specify the synthesized audiences that are to be added, but may instead rely on the CPS to do so automatically. In other embodiments, the client may specify the synthesized audiences for at least some of the content items.

Clients may specify resource budgets associated with the presentation of individual content items and/or with targeting algorithms associated with the selection of the items in some embodiments, e.g., via a set of ResourceBudgets messages 753. The provided budgeting information may be stored at the CPS, and a BudgetsStored message 755 may be sent to the client in some embodiments.

A request for selecting a content item to be presented to a content consumer may be transmitted to the CPS via a ContentPresentationRequest message 745 in the depicted embodiment. The context information associated with the request may be analyzed to identify synthesized audiences to augment or decorate the presentation request, and a search may be conducted for matching content within a content items database maintained at the CPS as described above. The matched content item identified for the request may be indicated via a MatchedContentItem message 746 in some embodiments.

Feedback data pertaining to the effectiveness of the use of synthesized audiences may be provided to the CPS in some embodiments, e.g., indicating how many items that were indicated in presented ads were considered for purchase or actually purchased, how long content consumers spent engaging with the presented content item and/or with additional content for which links were provided in the presented content item, and so on. A CMS client may submit an AnalyzeFeedbackData request 749 indicating a set of such feedback data should be analyzed by the CPS in the depicted embodiment. The feedback may be analyzed, and results provided to the client via one or more FeedbackAnalysisResults message 751 in some embodiments. The results may, for example, indicate that one or more synthesized audiences should preferably be combined or split, the relative effectiveness of different content items and/or targeting algorithms, and so on.

In some embodiments, programmatic interactions related to the use of probabilistic rules for content presentation, other than the interactions shown in FIG. 7, may be supported by a CPS 712. For example, a client may programmatically provide preferences regarding the augmentation of content presentation requests (e.g., limits on how many synthesized audiences should be added), request information about the available set of targeting algorithms, request metrics regarding how often various synthesized audiences were added to target audiences of a content item or to target audiences of content presentation requests, and so on.

FIG. 8 is a flow diagram illustrating aspects of operations which may be performed to utilize context-based probabilistic rules to select content items for presentation to content consumers, according to at least some embodiments. As shown in element 801, a collection of behavior-dependent audiences (BAs) may be populated for a set of content items, e.g., at a CPS similar to CPS 102 of FIG. 1. Records of past actions of content consumers (e.g., actions in response to earlier presentations of content items and/or actions independent of previous content presentations) who have opted in to the collection of their identity information may be used to distribute such content consumers among the different BAs in some embodiments. A given content consumer may be included as a member of several different BAs in some embodiments. In at least one embodiment, the CPS may obtain definitions and membership information of the BAs from a CPS client or some other data source. As such, the CPS may be able to identify or determine pre-populated BAs, instead of populating the BAs at the CPS itself in such embodiments.

A set of statistical or predictive relationships between (a) contextual properties of various types of content presentation triggering events and (b) membership in the different BAs may be identified at the CPS in some embodiments (element 804), e.g., based at least in part on analysis of records of earlier content presentations to members of the BAs, records of actions taken by the BA members, and so on. The statistical properties may, for example, include positive correlations and/or negative correlations or anticorrelations in some embodiments. In effect, the relationships may answer questions such as "if an ad request (the content presentation triggering event) is generated from a web site dealing with high-end travel (the contextual property) visited by an unidentified content consumer, what is the probability that the unidentified content consumer will in the future take actions similar to those of consumers that have been placed in the behavior-dependent audience "Mediterranean cruise passengers' (the BA)?".

Based at least in part on the statistical/predictive relationships, a set of rules for including content consumers (e.g., consumers that do not opt in for collection of their identity information) within one or more synthesized audiences (SAs) may be generated at the CPS in the depicted embodiment (element 807). The synthesized audiences that are expected to overlap with a given BA may not necessarily be defined at the same granularity as the BA—for example, corresponding to a BA labeled 'Mediterranean cruise passengers', SAs 'Europe travelers' or 'Cruise passengers' may be defined with respective rules for including content consumers in the SAs.

In response to a content presentation triggering event which has at least one targeted BA, the event's contextual properties or information may be used to add at least one SA to a set of target audiences associated with the event in various embodiments (element 810). A content item which was initially targeted for presentation to a BA may be presented to a content consumer who satisfies a rule for inclusion in a corresponding SA, even though the content consumer's identity may be unknown, and the content consumer may therefore not have been made a member of the BA. It is noted that in various embodiments, some of the operations shown in the flow diagram of FIG. 8 may be implemented in a different order than that shown in the figure, or may be performed in parallel rather than sequentially. Additionally, some of the operations shown in FIG. 8 may not be required in one or more implementations.

Figure 9:
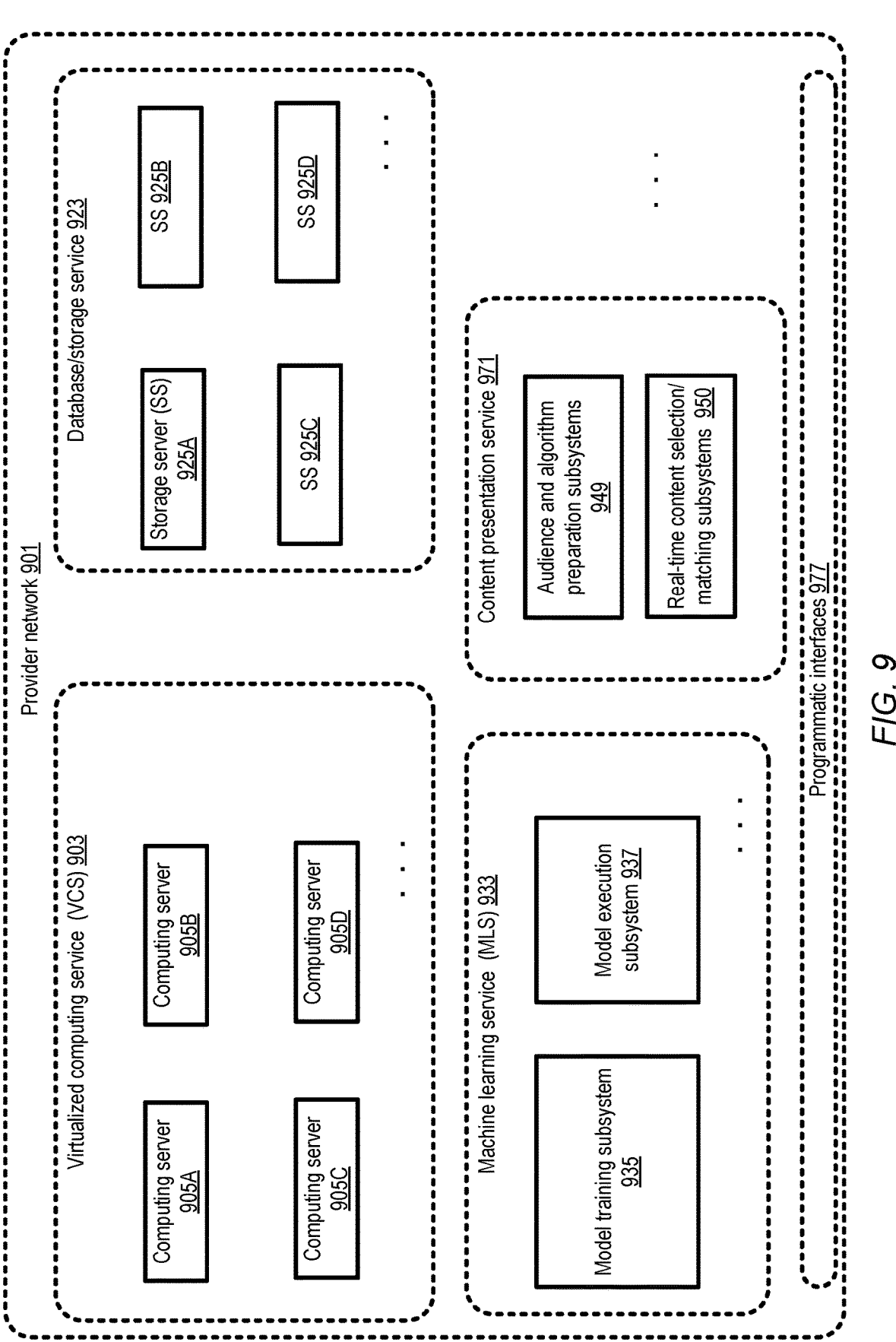
FIG. 9 illustrates an example provider network within which a content presentation service may be implemented, according to at least some embodiments.

FIG. 9 illustrates an example provider network within which a content presentation service may be implemented, according to at least some embodiments. In the depicted embodiment, provider network 901 may comprise resources used to implement a plurality of services, including for example a virtualized computing service (VCS) 903, a database/storage service 923, a machine learning service (MLS) 933 as well as a content presentation service (CPS) 971. The CPS 971 may comprise audience and algorithm preparation subsystems 949, as well as real-time content selection/matching subsystems 950 in the depicted embodiment. The audience and algorithm preparation subsystem may for example include subcomponents that perform tasks similar to those of audience definition subsystem 130 and automated targeting algorithms generation subsystem 170 of FIG. 1, while the real-time content selection/matching subsystems 950 may for example provide functionality similar to that described earlier for presentation request augmentation subsystem 140 and content item matching subsystem 165 of FIG. 1. The CPS 971 may also include other components not shown in FIG. 9. The MLS 933 may comprise a model training subsystem 935 and a model execution subsystem 937.

Components of a given service of a provider network may utilize components of other services in the depicted embodiment—e.g., for some tasks performed at the CPS 971 such as synthesis of audiences based on context properties, content item augmentation, targeting algorithms generation and the like, virtual machines implemented at computing servers such as 905A-905D of the virtualized computing service 903 may be used. Targeting algorithms, audience definitions, presentation request definitions, and content items utilized by the CPS may be stored at storage servers 925A-925D of database/storage service 923. Several of the tasks performed at the CPS, such as audience synthesis, targeting algorithm evaluation and ranking, etc. may utilize machine learning models trained and executed with the help of the MLS 933. Individual ones of the services shown in FIG. 9 may implement a respective set of programmatic interfaces 977 which can be used by external and/or internal clients (where the internal clients may comprise components of other services) in the depicted embodiment.

FIG. 10 illustrates examples of context-based content item matching algorithms which may be generated for a pair of content presentation environment categories, according to at least some embodiments. In the depicted scenario, content presentation requests for which items (e.g., ads pertaining to clothing or apparel) to be displayed/presented are to be selected by a CPS may be generated when a content consumer accesses either a phone application or a web page. These two types of pathways for generating content requests are referred to as content presentation environment category CPEA 1010 (the phone app) and CPEB 1015 (the web page). A behavior-dependent audience BA1, which includes identities of various content consumers that have purchased business apparel in the past and is labeled 'Frequent-business-apparel-buyer' is assumed to have been populated earlier based on analysis of consumer action records with accompanying identity information.

The available context information 1022A of the content item requests (the content presentation triggering events) generated at CPEA 1010 may, for example, include the identifier of the phone app and an approximate geographical location at which the phone application was accessed. The available context information 1022B of the content item requests (the content presentation triggering events) generated at CPEB 1015 may, for example, include the URL of the web page, the types of images/text that the web page at that URL contains, the approximate geographical location from which the web page was accessed, and so on. Thus, there may be partial overlap in the context information (the geographical location in the depicted example) available from different categories of content presentation environments in the depicted example scenario. In general, the kinds of context information available may not be identical for different content presentation environments.

Corresponding to the 'Frequent-business-apparel-buyer' BA1, a context-based synthetic audience inclusion rule set or algorithm 1030 may be generated in the depicted embodiment using the type of context information available from CPEA 1010. The rule set 1030 may, for example, comprise a rule such as "if ((AppID==A) AND (geo-location==Y)) add the content consumer to synthesized audience 'Interested-in-fashion' with audience ID SA1". In some cases, for example, the geo-location Y may have been classified by the CPS using action records to be a neighborhood in which people are generally wealthier and more likely to buy high-end clothing than the general population, for example. Also corresponding to the 'Frequent-business-apparel-buyer' BA1, another synthetic audience inclusion rule set or algorithm 1030 may be generated in the depicted embodiment using the context information available for CPEB 1015. This rule set 1032 may, for example, comprise a rule such as "if (URL is one of the URLs in set U1) AND (content-images are similar to Img1) AND (content-text includes text1) add the content consumer to synthesized audience 'Interested-in-business-casual-apparel' with audience ID SA2". Img1 may for example include pictures of business casual attire, and text1 may include descriptions of business wear.

Based on these kinds of synthesized audience inclusion rules, content item targeting algorithms TA1 and TA2 may be generated and utilized by the CPS in the depicted embodiment for matching content items to requests generated from CPEA and CPEB respectively. TA1 may be expressed as follows: "if (the ID of the content consumer is available from a content presentation request CPR1) AND (the content consumer is a member of BA1) then find a content item whose target audience includes BA1; otherwise, find a content item whose target audience comprises SA1". TA2 may be expressed as follows: "if (the ID of the content consumer is available from a content presentation request CPR2) AND (the content consumer is a member of BA1) then find a content item whose target audience includes BA1; otherwise, find a content item whose target audience comprises SA2". Using targeting algorithms such as SA1 and SA2, a higher priority is in some sense assigned to selecting content items based on identity information of the content consumer who triggered the content presentation request, and content items are selected based on other context information only if the identity information is unavailable (or if the identity information does not allow the CPS to identify a matching behavior-dependent audience).

Figure 11:
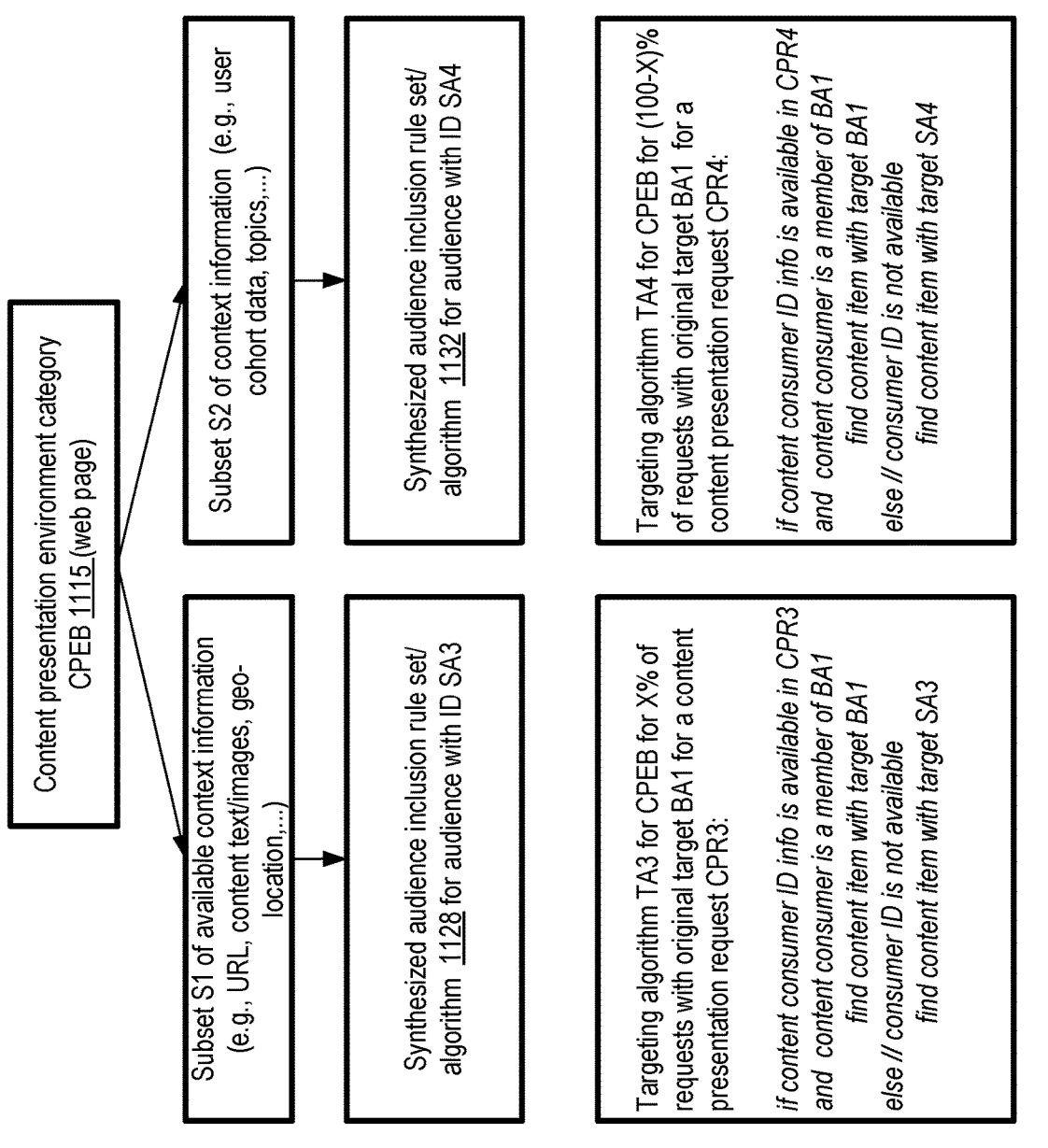
FIG. 11 illustrates examples of context-based content item matching algorithms which may be generated using respective subsets of context information available in a content presentation environment, according to at least some embodiments.

In FIG. 10, the two content presentation environments considered had different contextual properties, and these properties were used to generate respective targeting algorithms. FIG. 11 illustrates examples of context-based content item matching algorithms which may be generated using respective subsets of context information available in a content presentation environment, according to at least some embodiments. The content presentation environment category CPEB 1115 is a web page, and behavior-dependent audience BA1 'Frequent-business-apparel-buyer' discussed earlier in the context of FIG. 10 is again assumed to have been populated in the scenario of FIG. 11. This time, different subsets of the overall contextual information available from CPEB may be used to generate and try out different targeting algorithms. Subset S1 of available context information may include the URL, content text/images, and geographical location from which the content presentation request is triggered. Subset S2 may, for example, include user cohort information (generated, for example, in accordance with a proposed methodology for classifying unidentified consumers accessing web pages into groups of users or cohorts with similar interests), topics which may be automatically identified as being of interest to the unidentified content consumers accessing a web page, and so on. The content item owners and/or the web page owners may wish to determine which subset of the context information leads to the most effective matching of content items in the depicted embodiment. Based on respective subsets S1 and S2 of the context information, synthesized audience rule sets/algorithms 1128 (for including unidentified content consumers in audience SA3) and 1132 (for audience SA4) may be generated in the depicted embodiment at the CPS.

To evaluate the relative effectiveness of using the different subsets of context information, targeting algorithm TA3 may be used for a selected fraction X % of the requests received (with original target BA1) during a time period in the depicted embodiment, while targeting algorithm TA4 may be used for the remaining (100-X %) of the requests. TA3 may be expressed as follows: "if (the ID of the content consumer is available from a content presentation request CPR3) AND (the content consumer is a member of BA1) then find a content item whose target audience includes BA1; otherwise, find a content item whose target audience comprises SA3". TA2 may be expressed as follows: "if (the ID of the content consumer is available from a content presentation request CPR4) AND (the content consumer is a member of BA1) then find a content item whose target audience includes BA1; otherwise, find a content item whose target audience comprises SA4". The effectiveness of the two algorithms may be compared using feedback of the kind discussed above, enabling CPS clients on whose behalf the algorithms were generated to make better decisions regarding content item presentation in the future. In various embodiments the programmatic interfaces implemented at a CPS may provide visibility into the targeting algorithms available and/or allow CPS clients to specify targeting algorithms and conduct such effectiveness comparison experiments.

Figure 12:
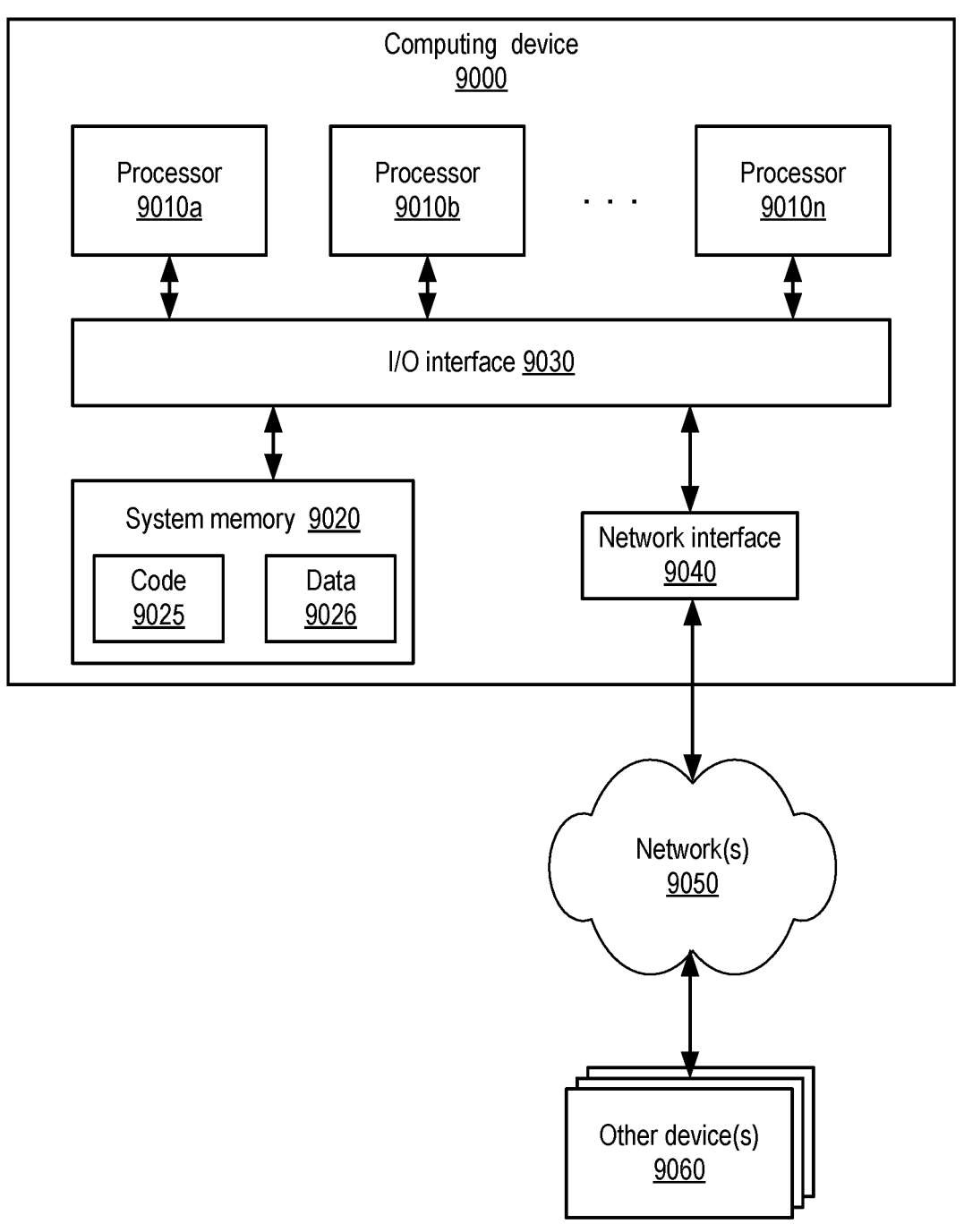
FIG. 12 is a block diagram illustrating an example computing device that may be used in at least some embodiments.

In at least some embodiments, a server that implements the types of techniques described herein (e.g., various functions of a CPS and other services of a provider network), may include a general-purpose computer system that includes or is configured to access one or more computer-accessible media. FIG. 12 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, ARM, or MIPS ISAs, or any other suitable ISA. In multiprocessor systems, each of processors 9010 may commonly, but not necessarily, implement the same ISA. In some implementations, graphics processing units (GPUs) and or field-programmable gate arrays (FPGAs) and/or other types of computation accelerators may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 11, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may represent one embodiment of a computer-accessible medium configured to store at least a subset of program instructions and data used for implementing the methods and apparatus discussed in the context of FIG. 1 through FIG. 11. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 12 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:

one or more computing devices;

wherein the one or more computing devices include instructions that upon execution on or across the one or more computing devices:

receive a plurality of records describing one or more content consumers, wherein the one or more content consumers have opted in to allow collection of a category of identity information with respect to one or more actions of the one or more content consumers;

populate a behavior-dependent audience with the one or more content consumers based at least in part on the category of identity information associated with the one or more actions of the one or more content consumers;

determine a statistical relationship between (a) a set of contextual properties of content presentation triggering events and (b) membership in the behavior-dependent audience;

generate, based at least in part on the statistical relationship, one or more rules for including triggering actions within a synthesized audience associated with the behavior-dependent audience, wherein the triggering actions are associated with unidentified content consumers, wherein identity information associated with the unidentified content consumers is not accessible according to a privacy control when requests for content for the unidentified content consumers are initiated;

receive one or more content item requests with identity information not accessible according to the privacy control and triggering actions associated with the one or more content item requests, wherein the triggering actions include respective context information for the one or more triggering actions, and wherein the one or more triggering actions are associated with one or more respective unidentified content consumers;

automatically identify, based at least on the received one or more triggering actions and respective context information of the one or more triggering actions, a particular content presentation triggering event for the one or more triggering actions; and in response to identifying the particular content presentation triggering event, automatically identify and transmit a content item to present to an unidentified content consumer of which the identity information is not accessible, wherein to automatically identify the content item, the one or more computing devices:

add, based at least in part on a particular contextual property of the particular content presentation triggering event, the synthesized audience to a set of target audiences of the particular content presentation triggering event; and identify the content item to be presented to the unidentified content consumer associated with the particular triggering action, wherein metadata of the content item indicates that a target audience of the set of target audiences is associated with the content item includes the behavior-dependent audience, wherein the particular triggering action associated with the unidentified content consumer is not a member of the behavior-dependent audience, and wherein the particular triggering action satisfies a rule for inclusion in the synthesized audience.

2. The system as recited in claim 1, wherein the one or more computing devices include further instructions that upon execution on or across the one or more computing devices:

determine an intersection between (a) a first set of targeting algorithms used to add synthesized audiences to the particular content presentation triggering event, wherein individual ones of the targeting algorithms of the first set differ from one another in the combinations of contextual properties that are used to add respective synthesized audiences to the set of target audiences of the particular content presentation triggering event and (b) a second set of targeting algorithms associated with the content item, wherein individual ones of the targeting algorithms of the second set differ from one another in the combinations of contextual properties that are used to add respective synthesized audiences to the set of target audiences of the content item;

store respective records indicating (a) one or more targeting algorithms which belong to the intersection and (b) a particular targeting algorithm, selected from the intersection, which led to selection of the content item for presentation to the unidentified content consumer; and cause at least one record of the respective records to be presented via a programmatic interface.

3. The system as recited in claim 1, wherein the content item comprises one or more of: (a) a social media notification, (b) at least a portion of a news article, (c) an audio segment, (e) a video, (f) an advertisement or (g) an item presented via a bidirectional interactive interface.

4. The system as recited in claim 1, wherein the content item is presented to the unidentified content consumer using one or more of: (a) a phone, (b) a mobile computing device, (c) an Internet-of-things (IoT) device, (d) a wearable computing device, (e) an automated personal assistant device, (f) a media streaming device, (g) an e-reader, or (h) a desktop computing device.

5. The system as recited in claim 1, wherein the particular content presentation triggering event comprises: (a) accessing of a web page, (b) accessing of a phone-based app, (c) powering on a device, (d) logging on to a device, (e) initiating a media stream or (f) a physical action taken by the unidentified content consumer.

6. The system of claim 1, wherein to determine the statistical relationship comprises:

training a machine learning model using the plurality of records to identify correlations between contextual properties and behavior-dependent audience membership;

generating, using the trained machine learning model, probability scores indicating likelihood of membership in the behavior-dependent audience based on different combinations of contextual properties; and selecting, based on the probability scores, specific combinations of contextual properties to use in rules for the synthesized audience.

7. The system of claim 1, wherein the one or more computing devices include further instructions that upon execution:

maintain respective performance metrics for different combinations of contextual properties used in synthesized audience rules;

automatically modify the rules based on the performance metrics to optimize content targeting accuracy; and automatically remove or deprecate rules whose performance metrics fall below a threshold.

8. The system of claim 1, wherein automatically identifying the content item comprises:

determining that multiple content items match the synthesized audience; calculating respective prediction scores for the multiple content items based on statistical correlations between their target audiences and the contextual properties of the particular triggering action; and selecting the content item with the highest prediction score.

9. The system of claim 1, wherein the one or more computing devices include further instructions that upon execution:

maintain a plurality of targeting algorithms that use different combinations of contextual properties;

track respective performance metrics and computational resource usage for the targeting algorithms;

automatically adjust resource allocation between the targeting algorithms based on their performance metrics and resource usage; and deprecate targeting algorithms whose resource usage exceeds a threshold relative to their performance metrics.

10. A computer-implemented method, comprising:

receiving a plurality of records describing one or more content consumers, wherein the one or more content consumers have opted in to allow collection of a category of identity information with respect to one or more actions of the one or more content consumers;

populating a behavior-dependent audience with the one or more content consumers based at least in part on analysis of records of actions of the plurality of records of the one or more content consumers;

generating, based at least in part on a relationship determined between membership in the behavior-dependent audience and a set of properties of content presentation triggering events, one or more rules for including triggering actions within a synthesized audience, wherein the triggering actions are associated with unidentified content consumers, wherein identity information associated with the unidentified content consumers is not accessible according to a privacy control when requests for content for the unidentified content consumers are initiated;

receiving one or more content item requests with identity information not accessible according to the privacy control and triggering actions associated with the one or more content item requests, wherein the triggering actions include respective context information for the one or more triggering actions, and wherein the one or more triggering actions are associated with one or more respective unidentified content consumers;

automatically identifying, based at least on the received one or more triggering actions and respective context information of the one or more triggering actions, a particular content presentation triggering event for the one or more triggering actions; and in response to identifying the particular content presentation triggering event, automatically identifying and transmitting a content item, to present to an unidentified content consumer of which the identify information is not accessible and of the one or more respective unidentified content consumers associated with a particular triggering action of the one or more triggering actions which satisfies a rule of the one or more rules for inclusion in the synthesized audience, and wherein the content item is targeted at least to the behavior-dependent audience.

11. The computer-implemented method as recited in claim 10, wherein the content item comprises one or more of: (a) a social media notification, (b) at least a portion of a news article, (c) an audio segment, (e) a video, (f) an advertisement or (g) an item presented via a bidirectional interactive interface.

12. The computer-implemented method as recited in claim 10, wherein the content item is presented to the unidentified content consumer using one or more of: (a) a phone, (b) a mobile computing device, (c) an Internet-of-things (IoT) device, (d) a wearable computing device, (e) an automated personal assistant device, (f) a media streaming device, (g) an e-reader, or (h) a desktop computing device.

13. The computer-implemented method as recited in claim 10, wherein the particular content presentation triggering event comprises: (a) accessing of a web page, (b) accessing of a phone-based app, (c) powering on a device, (d) logging on to a device, (e) initiating a media stream, or (f) a physical action taken by a content consumer.

14. The computer-implemented method as recited in claim 10, wherein generating the one or more rules comprises utilizing a machine learning model.

15. The computer-implemented method as recited in claim 10, further comprising:

obtaining, at a content presentation service via a programmatic interface from a content item source, an indication that a target audience for the content item comprises the behavior-dependent audience.

16. The computer-implemented method as recited in claim 15, further comprising:

adding, by the content presentation service, the synthesized audience to the target audience of the content item, without receiving a request to modify the target audience by adding the synthesized audience.

17. The computer-implemented method as recited in claim 10, further comprising:

obtaining, at a content presentation service via a programmatic interface, an indication of a target audience associated with the particular content presentation triggering event, wherein the target audience does not include the synthesized audience.

18. The computer-implemented method as recited in claim 17, further comprising:

adding, by the content presentation service, the synthesized audience to the target audience associated with the particular content presentation triggering event, without receiving a request to modify the target audience by adding the synthesized audience.

19. The computer-implemented method as recited in claim 10, further comprising:

obtaining, at a content presentation service, an indication of a respective resource budget associated with respective targeting algorithms for presentation of a set of content items including the content item; and utilizing, by the content presentation service, based at least in part on a particular resource budget associated with a particular targeting algorithm, the particular targeting algorithm to present the content item in response to the particular content presentation triggering event.

20. One or more non-transitory computer-accessible storage media storing program instructions that when executed on or across one or more processors:

receive a plurality of records describing one or more content consumers, wherein the one or more content consumers have opted in to allow collection of a category of identity information with respect to one or more actions of the one or more content consumers;

identify a behavior-dependent audience comprising the one or more content consumers, wherein the one or more content consumers were added to the behavior-dependent audience based at least in part on analysis of records of actions of the one or more content consumers;

generate, based at least in part on a relationship determined between membership in the behavior-dependent audience and a set of properties of content presentation triggering events, one or more rules for including triggering actions within a synthesized audience, wherein the triggering actions are associated with unidentified content consumers, wherein identity information associated with the unidentified content consumers is not accessible according to a privacy control when requests for content for the unidentified content consumers are initiated;

receive one or more content item requests with identify information not accessible according to the privacy control and triggering actions associated with the one or more content item requests, wherein the triggering actions include respective context information for the one or more triggering actions, and wherein the one or more triggering actions are associated with one or more respective unidentified content consumers;

automatically identify, based at least on the received one or more triggering actions and respective context information of the one or more triggering actions, a particular content presentation triggering event for the one or more triggering actions; and in response to identifying the particular content presentation triggering event, automatically identify and transmit a content item to be presented to an unidentified content consumer of which the identity information is not accessible and of the one or more respective unidentified content consumers associated with a particular triggering action of the one or more triggering actions which satisfies a rule of the one or more rules for inclusion in the synthesized audience, and wherein the content item is targeted at least to the behavior-dependent audience.

21. The one or more non-transitory computer-accessible storage media as recited in claim 20, wherein the content item comprises one or more of: (a) a social media notification, (b) at least a portion of a news article, (c) an audio segment, (e) a video, (f) an advertisement or (g) an item presented via a bidirectional interactive interface.

22. The one or more non-transitory computer-accessible storage media as recited in claim 20, wherein the content item is presented to the unidentified content consumer using one or more of: (a) a phone, (b) a mobile computing device, (c) an Internet-of-things (IoT) device, (d) a wearable computing device, (e) an automated personal assistant device, (f) a media streaming device, (g) an e-reader, or (h) a desktop computing device.

23. The one or more non-transitory computer-accessible storage media as recited in claim 20, wherein the particular content presentation triggering event comprises: (a) accessing of a web page, (b) accessing of a phone-based app, (c) powering on a device, (d) logging on to a device, (e) initiating a media stream or (f) a movement of the unidentified content consumer.

24. The one or more non-transitory computer-accessible storage media as recited in claim 20, wherein generating the one or more rules comprises utilizing a machine learning model.

*    *    *    *    *